United States Patent
von Behren et al.

(10) Patent No.: US 8,196,131 B1
(45) Date of Patent: Jun. 5, 2012

(54) PAYMENT APPLICATION LIFECYCLE MANAGEMENT IN A CONTACTLESS SMART CARD

(75) Inventors: Rob von Behren, Berkeley, CA (US); Jonathan Wall, San Francisco, CA (US); Alexej Muehlberg, Hamburg (DE); Hauke Meyn, Krempermoor (DE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/244,806

(22) Filed: Sep. 26, 2011

Related U.S. Application Data

(60) Provisional application No. 61/424,609, filed on Dec. 17, 2010.

(51) Int. Cl.
*G06F 9/44* (2006.01)
*G06Q 20/00* (2012.01)

(52) U.S. Cl. .............................. 717/168; 705/64; 705/65

(58) Field of Classification Search .......... 717/168–178; 705/64–79
See application file for complete search history.

(56) References Cited

U.S. PATENT DOCUMENTS

| | | | |
|---|---|---|---|
| 4,851,653 | A | 7/1989 | Limisaque et al. |
| 5,221,838 | A | 6/1993 | Gutman et al. |
| 5,991,399 | A | 11/1999 | Graunke et al. |
| 6,005,942 | A | 12/1999 | Chan et al. |
| 6,092,201 | A | 7/2000 | Turnbul et al. |
| 6,141,752 | A | 10/2000 | Dancs et al. |
| 6,151,657 | A | 11/2000 | Sun et al. |
| 6,233,683 | B1 | 5/2001 | Chan et al. |
| 6,484,174 | B1 | 11/2002 | Wall et al. |
| 6,601,761 | B1 * | 8/2003 | Katis .............................. 235/379 |
| 6,609,113 | B1 | 8/2003 | O'Leary et al. |
| 6,633,984 | B2 * | 10/2003 | Susser et al. .................... 726/21 |
| 6,647,260 | B2 | 11/2003 | Dusse et al. |
| 6,792,536 | B1 | 9/2004 | Teppler |

(Continued)

FOREIGN PATENT DOCUMENTS

EP      1 004 992 A2      5/2000

(Continued)

OTHER PUBLICATIONS

"Runtime Environment Specification, Java Card™ Platform, Version 3.0, Classic Edition," Mar. 2008, Sun Microsystems, Inc.*

(Continued)

*Primary Examiner* — Wei Zhen
*Assistant Examiner* — Qing Chen
(74) *Attorney, Agent, or Firm* — Johnson, Marcou & Isaacs, LLC

(57) ABSTRACT

Managing the lifecycle of a card software application received from a remote trusted service manager (TSM) for a secure element of a contactless smart card comprises receiving, from the remote TSM, a card application and an instruction for performing a function on the card application. The card application comprises account information of one card instrument and an application identifier (AID). The instruction is rendered in the secure element to perform the function on the card application. The card application is registered in a control application of the secure element using the AID. The control application comprises a list of AIDs of previously received and registered card software applications and a card application status tag for each of the listed AIDs. The card application status tag of the registered card application is updated in the control application based on the function performed.

22 Claims, 9 Drawing Sheets

U.S. PATENT DOCUMENTS

| | | | |
|---|---|---|---|
| 6,823,520 B1* | 11/2004 | Susser et al. ............... | 719/315 |
| 6,907,608 B1* | 6/2005 | Susser et al. ............... | 719/315 |
| 6,922,835 B1* | 7/2005 | Susser et al. ............... | 719/316 |
| 6,963,270 B1 | 11/2005 | Gallagher, III et al. | |
| 7,093,122 B1* | 8/2006 | Susser et al. ............... | 713/153 |
| 7,140,549 B2 | 11/2006 | De Jong | |
| 7,152,782 B2 | 12/2006 | Shenker et al. | |
| 7,159,180 B2 | 1/2007 | Ward | |
| 7,165,727 B2* | 1/2007 | de Jong ............... | 235/492 |
| 7,191,288 B2* | 3/2007 | de Jong ............... | 711/115 |
| 7,206,769 B2* | 4/2007 | Laurent et al. ............... | 705/65 |
| 7,232,073 B1 | 6/2007 | de Jong | |
| 7,243,853 B1 | 7/2007 | Levy et al. | |
| 7,275,685 B2 | 10/2007 | Gray et al. | |
| 7,346,170 B2 | 3/2008 | Asano et al. | |
| 7,349,885 B2 | 3/2008 | Gangi | |
| 7,353,396 B2 | 4/2008 | Micali et al. | |
| 7,360,691 B2 | 4/2008 | Takayama | |
| 7,374,099 B2 | 5/2008 | De Jong | |
| 7,382,762 B2 | 6/2008 | Chmora et al. | |
| 7,395,535 B2* | 7/2008 | Susser et al. ............... | 718/1 |
| 7,469,151 B2 | 12/2008 | Khan et al. | |
| 7,478,389 B2* | 1/2009 | Susser et al. ............... | 718/1 |
| 7,502,946 B2 | 3/2009 | Perkins et al. | |
| 7,607,175 B2* | 10/2009 | Susser et al. ............... | 726/27 |
| 7,631,346 B2 | 12/2009 | Hinton et al. | |
| 7,631,810 B2 | 12/2009 | Liu et al. | |
| 7,708,198 B2 | 5/2010 | Gangi | |
| 7,712,658 B2 | 5/2010 | Gangi | |
| 7,739,731 B2 | 6/2010 | Violleau et al. | |
| 7,860,486 B2 | 12/2010 | Frank et al. | |
| 7,967,215 B2 | 6/2011 | Kumar et al. | |
| 8,126,806 B1* | 2/2012 | DiMartino et al. ............... | 705/41 |
| 8,150,767 B2* | 4/2012 | Wankmueller ............... | 705/41 |
| 2001/0011250 A1* | 8/2001 | Paltenghe et al. ............... | 705/41 |
| 2001/0021927 A1* | 9/2001 | Laurent et al. ............... | 705/65 |
| 2001/0027441 A1* | 10/2001 | Wankmueller ............... | 705/41 |
| 2001/0039657 A1 | 11/2001 | Fopeano et al. | |
| 2002/0004783 A1* | 1/2002 | Paltenghe et al. ............... | 705/41 |
| 2002/0042776 A1 | 4/2002 | Woo et al. | |
| 2002/0068554 A1 | 6/2002 | Dusse | |
| 2002/0194138 A1 | 12/2002 | Dominguez et al. | |
| 2003/0074579 A1 | 4/2003 | Della-Libera et al. | |
| 2003/0140176 A1* | 7/2003 | Susser et al. ............... | 709/315 |
| 2004/0029569 A1* | 2/2004 | Khan et al. ............... | 455/414.1 |
| 2004/0030601 A1* | 2/2004 | Pond et al. ............... | 705/16 |
| 2004/0123152 A1 | 6/2004 | Le Saint | |
| 2004/0128259 A1 | 7/2004 | Blakeley et al. | |
| 2004/0140351 A1 | 7/2004 | Flugge et al. | |
| 2005/0071418 A1 | 3/2005 | Kjellberg et al. | |
| 2005/0091659 A1* | 4/2005 | Susser et al. ............... | 718/108 |
| 2005/0102679 A1* | 5/2005 | Susser et al. ............... | 719/315 |
| 2005/0184163 A1* | 8/2005 | de Jong ............... | 235/492 |
| 2005/0184164 A1* | 8/2005 | de Jong ............... | 235/492 |
| 2005/0184165 A1* | 8/2005 | de Jong ............... | 235/492 |
| 2005/0188360 A1 | 8/2005 | De Jong | |
| 2005/0193218 A1 | 9/2005 | Susser et al. | |
| 2005/0222961 A1 | 10/2005 | Staib et al. | |
| 2006/0036570 A1 | 2/2006 | Schaefer et al. | |
| 2006/0041507 A1 | 2/2006 | Novack et al. | |
| 2006/0126831 A1 | 6/2006 | Cerruti et al. | |
| 2006/0165060 A1 | 7/2006 | Dua | |
| 2006/0219774 A1 | 10/2006 | Benco et al. | |
| 2007/0067325 A1 | 3/2007 | Weitzner et al. | |
| 2007/0135164 A1 | 6/2007 | Lee | |
| 2007/0169043 A1 | 7/2007 | Violleau et al. | |
| 2007/0226786 A1 | 9/2007 | Berger et al. | |
| 2008/0056501 A1 | 3/2008 | McGough et al. | |
| 2008/0130902 A1 | 6/2008 | Foo Kune et al. | |
| 2008/0162834 A1 | 7/2008 | Brokenshire et al. | |
| 2008/0167988 A1* | 7/2008 | Sun et al. ............... | 705/39 |
| 2008/0208681 A1* | 8/2008 | Hammad et al. ............... | 705/13 |
| 2008/0208762 A1* | 8/2008 | Arthur et al. ............... | 705/79 |
| 2008/0270253 A1 | 10/2008 | Huang | |
| 2009/0158028 A1 | 6/2009 | Jung et al. | |
| 2009/0239512 A1* | 9/2009 | Hammad et al. ............... | 455/414.1 |
| 2009/0261172 A1 | 10/2009 | Kumar et al. | |
| 2009/0307142 A1 | 12/2009 | Mardikar | |
| 2009/0312011 A1 | 12/2009 | Huomo et al. | |
| 2010/0012732 A1* | 1/2010 | Pinzinger et al. ............... | 235/492 |
| 2010/0042824 A1 | 2/2010 | Lee et al. | |
| 2010/0050271 A1 | 2/2010 | Saarisalo | |
| 2010/0058463 A1 | 3/2010 | Bertin | |
| 2010/0063893 A1 | 3/2010 | Townsend | |
| 2010/0088237 A1 | 4/2010 | Wankmueller | |
| 2010/0114731 A1 | 5/2010 | Kingston et al. | |
| 2010/0131413 A1* | 5/2010 | Kranzley et al. ............... | 705/66 |
| 2010/0138518 A1 | 6/2010 | Aiglstorfer et al. | |
| 2010/0203870 A1* | 8/2010 | Hubinak et al. ............... | 455/414.1 |
| 2010/0205432 A1 | 8/2010 | Corda et al. | |
| 2010/0211507 A1* | 8/2010 | Aabye et al. ............... | 705/71 |
| 2010/0291896 A1 | 11/2010 | Corda | |
| 2010/0291904 A1 | 11/2010 | Musfeldt et al. | |
| 2010/0306076 A1 | 12/2010 | Taveau et al. | |
| 2010/0306531 A1 | 12/2010 | Nahari | |
| 2010/0323681 A1 | 12/2010 | Corda et al. | |
| 2010/0330958 A1 | 12/2010 | Corda et al. | |
| 2011/0029671 A1 | 2/2011 | Deprun et al. | |
| 2011/0072425 A1* | 3/2011 | Lemonnier et al. ............... | 717/178 |
| 2011/0078081 A1 | 3/2011 | Pirzadeh et al. | |
| 2011/0087610 A1 | 4/2011 | Batada et al. | |
| 2011/0113473 A1 | 5/2011 | Corda et al. | |
| 2011/0131421 A1* | 6/2011 | Jogand-Coulomb et al. .. | 713/189 |

FOREIGN PATENT DOCUMENTS

| | | |
|---|---|---|
| EP | 1 318 488 A2 | 6/2003 |
| EP | 2 043 060 A1 | 4/2009 |
| GB | 2457221 A | 8/2009 |
| WO | WO 98/52158 A2 | 11/1998 |
| WO | WO 01/22374 | 3/2001 |
| WO | WO 2004/054125 | 6/2004 |

OTHER PUBLICATIONS

U.S. Appl. No. 60/338,419, filed Dec. 4, 2001, Merckling et al.

Boly, J.P. et al., "The ESPIRIT Project CAFE—High Security Digital Payment Systems," ESCORICS 94 (Third European Symposium on Research in Computer Security), LNCS 875, 1994, pp. 217-230, Springer-Verlag, Berlin.

Chen, Z., "How to Write a Java Card Applet: A Developer's Guide," JavaWorld.com, Jul. 1, 1999.

Corum, C., Editor, "Santa Clara Puts Payments in 'Palm' of Your Hand: Palms and Cellphones Initiate Payments to Campus Card System," CR80News.com, May 2003, vol. 2, No. 5.

Daswani, N. et al., "SWAPEROO: A Simple Wallet Architecture for Payments, Exchanges, Refunds, and Other Operations," Proceedings of the 3rd USENIX Workshop on Electronic Commerce, Aug. 31-Sep. 3, 1998.

Dotzer, F., "Aspects of Multi-Application Smart Card Management Systems," Thesis at the Lehrstuhl fur Dateoverarbeitung (LDV) (Institute of Data Processing), Munchen Technical University, Oct. 15, 2002.

Hernandez, R., "E-Wallet with Decentralized Credential Keepers," Master Thesis for Institutt for Telematikk, Jun. 30, 2003.

Hernandez, R., "E-Wallet Software Architecture and Decentralized Credentials," Norsk Informatikkonferancse (NIK), 2003.

Huang, P. et al., Future Personal 'E-Payment': IrFM, IEEE Wireless Communications, Feb. 2006.

Mjolsnes, S., "On-Line E-Wallet System with Decentralized Credential Keepers," Mobile Networks and Applications 8, 87-99, 2003, Kluwer Academic Publishers.

The Smart Card Alliance, "Mobile Payments at the Physical Point-of-Sale: Assessing U.S. Market Drivers and Industry Direction", Pub. No. PT-05001, Apr. 2005.

Yun, S. et al., "Design and Implementation of Wireless Payment System Using GVM and MobileC," Proceedings of the International Conference on Mobile Computing and Ubiquitous Networking, 2005, pp. 1-10, vol. 1.

"EPC—GSMA Trusted Service Manager Service Management Requirements and Specifications", retrieved from http://www.europeanpaymentscouncil.eu/documents/EPC220-08%20EPC%20GSMA%20TSM%20WP%20V1.pdf, Jan. 2010.

"Global Platform: Contacless Services, Card Specification v2.2," Version 1.0, Feb. 2010, GlobalPlatform Inc.

Office Action dated Dec. 21, 2011, issued in a co-pending U.S. Appl. No. 13/244,824, filed Sep. 26, 2011.
Office Action dated Jan. 18, 2012, issued in a co-pending U.S. Appl. No. 13/244,777, filed Sep. 26, 2011.
Office Action dated Dec. 28, 2011, issued in a co-pending U.S. Appl. No. 13/244,775, filed Sep. 26, 2011.
Office Action dated Jan. 5, 2012, issued in a co-pending U.S. Appl. No. 13/244,756, filed Sep. 26, 2011.
AN10787 MIFARE Application Directory (MAD), NXP B.V., Jul. 7, 2010, 23 Pages.
"The Role of the TSM," The Review, Winter 2008, Gemalto N. V., p. 7.
Yin, "Google Wallet Aims to Make Mobile Payments Mainstream," May 26, 2011, PCmag.com.
Yin, "Google Wallet is Just Another Pilot, Says World's Largest SIM Card Maker," May 27, 2011, PCmag.com.
Yliuntinen, "$3^{rd}$ party TSM Management of SIM Cards," Sep. 2011, Cryptomathic, 5 pgs.
Xu et al., "Design of Objects Sharing Mechanism with Security Domain in Java Smart Card," Electronic Computer Technology, 2009 International Conference.
Anonymous, "MIFARE Standard Card IC MF1 IC S50 Function Specification," Philips Semiconductors, Product Specification, No. Revision 4.0, pp. 1-18, XP002537152, Jul. 1, 1998.

* cited by examiner

PAYMENT APPLICATION LIFECYCLE MANAGEMENT IN A CONTACTLESS SMART CARD

RELATED APPLICATIONS

This application claims priority to U.S. Provisional Patent Application No. 61/424,609, filed Dec. 17, 2010 and entitled "Multiple Contactless Payment Application, Control, And Architecture." The entire contents of the above-identified priority application are hereby fully incorporated herein by reference.

TECHNICAL FIELD

The invention relates generally to systems, methods, and devices for controlling multiple card software applications using a control software application, the control and card software applications resident in a secure element of a contactless smart card.

BACKGROUND

Contactless payment technology incorporates proximity communications between two devices to authenticate and enable payment for goods and services over the air (OTA) or without physical connection. Near Field Communication (NFC) is an example of a proximity communication option that can enable contactless payment technologies and that is supported by the Global System for Mobile Communications (GSM) Association. RFID is an example of a proximity communication method that can be adapted to enable NFC contactless payment technology. NFC communication ranges generally range from about 3 to about 4 inches. Such short communication distances limit, as well as, enable secure communication between close field proximity enabled devices. Proximity enabled contactless payment also can be implemented on Code Division Multiple Access (CDMA) devices with an embedded secure element within an NFC controller or a Re-usable Identification Module (R-UIM) type card.

In GSM phones, a proximity enabled (for example, NFC) controller with an antenna is incorporated into the device with the secure contactless software applications located on a smart chip. The smart chip can be further incorporated into one of several exemplary phone components, including a standard Subscribed Identity Module (SIM) card, a separate Mobile Secure Digital Card (for example, a secure digital (SD) card with non-volatile memory, such as EEPROM), or an embedded chip for the payment module purposes. An NFC-enabled contactless payment device enables financial transactions, ticketing, secure authentication, and coupons among several services that are available to the device owner.

The NFC contactless payment device can function as a credit card to enable purchases at the point-of-sale (POS) or even via merchant websites, where in the later case a GSM phone can be used to secure bank information from an authenticating server called a trusted service manager (TSM). The bank information is used in a form entry for payments on a merchant website. The TSM hosts and controls all credit card information sent to or withdrawn from a trusted NFC enabled contactless payment device.

Card software applications can be identified by Application Identifiers (AIDs) and are typically stored within the secure element of the mobile device. AIDs may be standardized by the ISO 7816 specification and include between 5 and 16 bytes. The first five bytes collectively of the AID is called a Registered Identifier (RID), which typically identifies the card company—for example, MasterCard®, Discover®, or Visa®. The subsequent bytes may include the PIX or Proprietary application Identifier Extension, which can be used to identify such information as the application type, version, manufacturer, and other information. The secure element can exist within a removable smart chip, SD card, or embedded within a fixed chip on the mobile device. The secure element allows a wallet software application resident on the mobile device and accessible by the mobile device user to interact securely with certain functions within the secure element, while protecting a majority of the information stored within it. Further, a secure communication channel uses encryption methods for communication between the secure element and external device and software. The secure element on the smart card includes crypto processors for calculating crypto algorithms, memory controller units to manage the Read Only Memory (ROM), Ready Access Memory (RAM), and EEPROM flash memory within the smart card.

SUMMARY

In certain exemplary embodiments, a computer-implemented method for controlling a plurality of contactless smart card software applications using a control software application, the control software application and the plurality of contactless smart card software applications resident in a secure element comprises receiving, at the control software application in the secure element, an application identifier (AID) of a selected contactless smart card software application from the plurality of registered contactless smart card software applications and a software code for an instruction to be performed on the selected contactless smart card software application; executing, in the secure element, at one of the control software application, the card runtime environment, or the selected contactless smart card software application, a process method function call associated with the software code, thereby performing the instruction on the selected contactless smart card software application; and updating, at the control software application, a registered list of the plurality of contactless smart card software applications with a software coded tag responsive to the instruction performed.

In certain exemplary embodiments, a computer-implemented method for communication between a software application midlet of a contactless payment device and a control applet resident within a secure element of a smart card, the smart card resident in the contactless payment device comprises selecting, on the software application midlet, at least one of plurality of card applets to configure from a registered list of card applets, wherein the registered list comprises application identifiers (AIDs) of card applets resident in the secure element transmitting, through a secure channel, to the control applet on the secure element, the selected card applet's AID, and a computer-coded instruction for a selected function to be performed on the selected card applet; invoking, by the control applet, process method function calls of a card runtime environment, wherein the process method function calls are defined by the card issuer or the card runtime environment for performing the selected function on the selected card applet; and rendering, by the card runtime environment, the process method function calls, thereby performing the selected function on the selected card applet.

In certain exemplary embodiments, a computer-implemented method to edit a card software application resident in the secure element of a contactless smart card, the card software applications for routing external card reader requests to one of a plurality of alternate card software applications, comprises selecting, in the secure element, using a process method function call of a card runtime environment, one of a plurality of card software applications for personalization, wherein the process method function call uses an application identifier (AID) of the card software application for selection; authenticating, in the secure element, access to the card software application using issuer security domain (ISD) keys stored in the contactless smart card, thereby gaining access to the data contents of the card software application; editing, in the secure element, the card software application by editing at least one of file control information (FCI), a priority status tag, and application discretionary data, wherein the edited FCI comprises the routing information to route the external card reader requests received at the card software application to an alternate AID of the alternate card software application; and installing, in the secure element, the edited card software application, thereby enabling the edited card software application to instantiate a related card sharable interface object (SIO), the SIO comprising at least the alternate AID defined in the edited information for routing the external card reader requests.

In certain exemplary embodiments, a computer-implemented method for managing the lifecycle of a card software application received from a remote trusted service manager (TSM) to a secure element of a contactless smart card comprises receiving, from the remote TSM to a card runtime environment of the secure element, one of a plurality of card software applications in computer-coded form and one of a plurality of computer-coded instructions for performing a function on the received card software application, wherein the card software application comprises account information of one card instrument and an application identifier (AID) code; rendering, in the secure element, the computer-coded instruction, wherein the rendered computer code performs the function on the card software application or invokes a process method function call of the card runtime environment to perform the function on the card software application; registering, in a control software application of the secure element, the card software application using the AID code, wherein the control software application comprises a list of AIDs of previously received and registered card software applications and a card application status tag for each of the listed AIDs; and updating, in the control software application, the card application status tag of the registered card software application, wherein the card application status tag is updated with a computer code related to the function performed.

In certain exemplary embodiments, a computer-implemented method for using sharable interface objects (SIOs) to share data between a control applet and a plurality of card applets across at least one secure firewall in a secure element of a contactless smart card comprises creating, in the secure element, a control SIO owned by the control applet and at least a card SIO owned by one of the plurality of card applets, wherein the card applet and the card SIO are located within a card memory context, the card memory context separated by the secure firewall from a control memory context comprising the control applet and the control SIO; enabling, in the secure element, the control applet to request access to the card SIO across the secure firewall; and invoking, in the secure element, by the control applet a data request or a data transmission process method function call in the card applet for returning card SIO data to the control applet or transmitting new SIO data to the card SIO, wherein the invoking step is initiated when the request for access in the enabling step is granted.

DETAILED DESCRIPTION OF EXEMPLARY EMBODIMENTS

Figure 1:
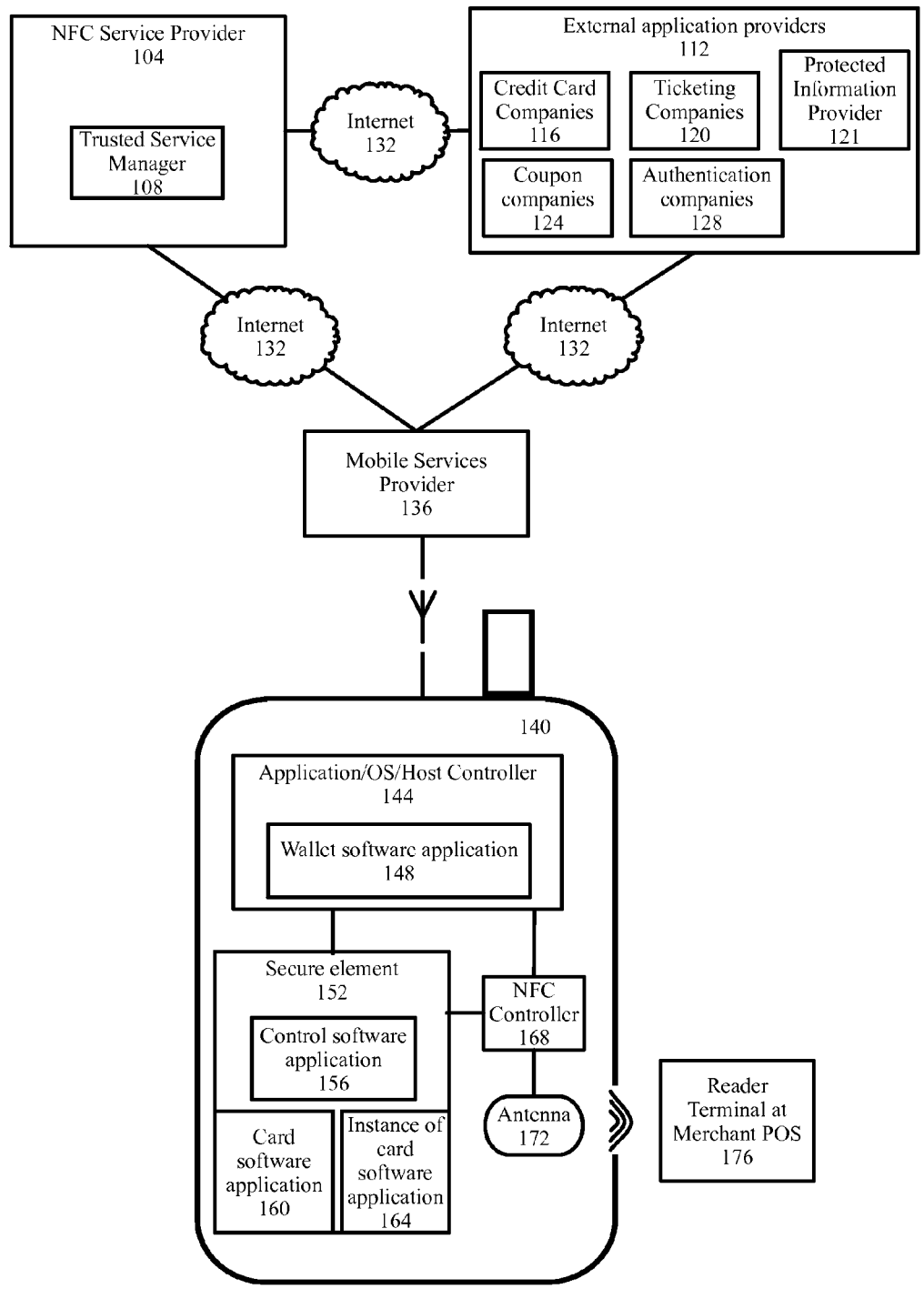
FIG. 1 depicts a block diagram illustrating systems for controlling multiple secure element based card software applications using a secure element based control software application according to certain exemplary embodiments.

Contactless payment devices typically include smart phones; mobile phones; PDAs; mobile computing devices such as netbooks and iPad®s; other electronically enabled key fobs; electronically enabled credit card type cards; and other devices. Some devices can be used for multiple purposes, including financial transactions, coupons, ticketing, secure authentication, and related applications. An NFC enabled chip is implemented, either independently or on existing components, within the contactless payment device, such as the SIM card, U-RIM card, an embedded chip or an external SD card, or any type of smart card.

The secure element can be contained on the contactless payment device, for example, on a smart card capable of hosting secure elements. In certain exemplary embodiments, SIM cards may be capable of hosting a secure element, for example, an NFC SIM Card. The secure element includes components typical of a smart card such as the crypto processors and random generators. A master file in the file structure of the smart card includes additional files that retain authentication keys and application information within the card. The secure element communicates with an NFC controller and the host controller on the contactless payment device. In an exemplary embodiment, the systems and methods described herein can be implemented in Java, using Java Card for the Smart Card applets and J2ME for the midlet applications running on the contactless payment device. The term "card software application" and "card applet" are used interchangeably in this disclosure to refer to a software applications running within the secure element of a smart card. A midlet, for example, a "wallet midlet" or a "Wallet" software application may be a user-interface software application can be developed as a J2ME midlet, where the midlet can be downloaded and installed in the device. Further, the midlet can be made available to a user of the mobile device via a user-interface for making changes with the contents of the midlet functionality.

Card software application providers typically establish Issuer Security Domain (ISD) within the secure element of a smart card, where the ISD utilize keys on the smart card for communication across ISDs or between data objects created by the applets in different ISDs. The ISD may be used to load and delete payment system packages, to instantiate payment applications from external devices, to instantiate a Trusted Service Manager (TSM) Security Domain for download of payment and other card software applications, to lock/unlock card software applications, and to terminate secure element software applications. A proximity payment system environment (PPSE) provides an application directory listing, according to EMVCo (Eurocard-Mastercard-Visa standards) and the specifications of the various card software applications. An updatable directory listing in a file control information (FCI) template is available to a control software application within the secure element. The FCI may be updated with data obtained from the control application and the TSM. The PPSE may be owned by the issuer of the secure element in the mobile device, where the issuer controls the authentication and approval of software applications installed to the secure element. The payment applications may be loaded on the mobile device as a card software application package, where each package, for example, a MasterCard package, typically contains software code for all supported payment applications within MasterCards" offerings, e.g., Mstripe, Mchip, and any other suitable payment application. The payment application creates data objects to control flow of application data. The payment application and the data objects inside the software application package may be protected by a firewall that is described by virtue of the operating system (OS) that functions as the interface among the multiple software application and the control application. In certain examples, the OS is a Java Card operating system (JCOS).

In certain exemplary embodiments, the card software applications and the control software application may be applets within the JCOS structure. The applets, outside of MasterCard's card software applets, each use full-size AIDs for recognition, and may be applets developed in a Java compiler/converter environment. For certain MasterCard payment applications, a "umbrella application," referred to herein as the generic software application, for all payment type card software applications may be used, where the first 7 bytes in the AID of each card software application is the same. An instance of the MasterCard payment application may be selected for activation and can be masked using the 7 byte AID, which hides the full-size AIDs from the terminal. The masked AID then redirects the terminal request for an application to the activated instance of the payment application underlying the masked 7 byte AID.

In certain exemplary embodiments, a user preference setting is exposed and controlled by the control software application. Direct access to an instance of the card software application occurs only if the full-size AID is listed. An unselected user preference for an instance of a card application to be listed within the PPSE application directory indicates that the selection of a payment application is rejected. When a full-sized AID is selected, the directory software application then routes payment transaction commands according to user selected settings, directly to the selected instance. Instantiation and creation of a card software instance during post-issuance and routing of the card software application object, as well as personalization commands for the card software application are all functions performed by the control software application, with support from the card software applications being installed.

Java Specification Requests (JSR) may be used in J2ME (Java Micro edition) to standardize various communication channels between the various components in the contactless payment device. In certain exemplary embodiments, the JSR177 specification is used to allow communication between a graphical user interface midlet application on the device operating system and an applet in the secure element of the smart card using application protocol data unit (APDU). The JSR257 specifications allows the midlet application on the device to access the radio interface via the ISA 14443 standard, and also can provide a low level interface to the secure element. JSR177 establishes security and trust for application programming interfaces (API), where the API supports communication between the device and the smart card. A card execution environment, for e.g., in the case of a Java Card, a Java Card Runtime Environment (JCRE) and the Java Card API may be stored in the ROM of the smart card. Payment type card software applications and the control software application can be developed as API Java packages and may be loaded into the volatile flash memory section of the smart card. The card execution environment includes an instruction set for compiling software applications as well as application programming interface (API) function calls. The card execution environment may be implemented via a virtual machine that compiles the overlying software applications to the native machine language of the underlying physical hardware. Java bytecode and .NET bytecode are examples of the instruction set, while Java class libraries and .NET class libraries are examples of the API function calls that can be implemented via a card virtual machine, thereby forming a card execution environment.

In certain exemplary embodiments, security of data objects from each application in the smart card prevents rogue applications and coding errors from stealing data. This security is implemented via applet firewalls in the Java Card Platform. Spaces can be allocated to data objects for the card execution environment (e.g., JCRE for Java Cards), and for each applet and applet group. These spaces are called "contexts." A "JCRE context" is an allocated space for the java card runtime environment in the smart card temporary memory. Group contexts may be allocated to applets within an application, where an applet performs a sub-routine within an application on the smart card. Each context is separated by an in-built firewall that prevents data objects from being shared. While this implementation safeguards the data objects from other applications, it prevents multiple instances of an application type from sharing information. An application for a single card type, with multiple instances (for different financial instruments) can be developed, where the multiple instances are separate applets, and therefore share the same data objects. When one applet calls another applet within the application group, the control for data objects is transferred to the second applet. Routing of the application to an applet allows an instance of the application to be selected.

In certain exemplary embodiments, the data objects created and owned by each card software application can be shared between multiple applications using shareable interface objects (SIOs). This implementation allows the control software application to control selected data objects from other software applications within the smart card, without including security and firewall procedures. This implementation allows the controller application to review the status of other card software application type applets via review of the data objects generated by each applet. Each applet in the secure element of the smart card is identified by a unique AID. In certain exemplary embodiments, the control software application and each of the card software applications are included within independent applets, each with its own fixed AID. When an applet is created, the JCRE is notified and the applet is registered using the assigned AID of the applet. Thereafter, the JCRE encapsulates the AID bytes into an AID object, which is an object defined by the JCRE system. An applet that creates an SIO for the purpose of sharing may be referred to as the server applet, with the AID object being used by other applets, the other applets being referred to as client applets that use the server AID for identification purposes. The SIO is shareable between other applets through the firewall by the server-client relationship established within the JCRE system. However, the applet that requests the shareable object gains control of the object until it has finished its processes; thereafter, the SIO may be available to the other applets, provided the other applets have the required predefined permissions.

In certain exemplary embodiments, the server-client SIO definition within the JCRE allows a "wallet" software application to track all instances of the card software applications in the secure element via the control software application in the smart card. Events may be referred to functions performed on each of the card software applications. Events having occurred and the state of each card software application instance is logged using the information from the respective SIO for each of the applets. In certain exemplary embodiments, the control software application contains a user preferred list (UPL) of the preferred payment applications. In certain exemplary embodiments, the preferred card software applications are presented in the list, while other non-preferential card software applications are not presented in the list. The wallet application contains a list of all payment applications registered with the JCRE. Through the SIO, using the secure element JSRs, the wallet application can be used by the contactless payment device user to select certain card software applications as preferred applications via a user-interface, thereby creating an order based on the type of card software application. The various functions performed via a user-interface instruction may include instructions to enable or disable certain card software applications and to delete a card software application instance. In certain exemplary embodiments, all of these exemplary JSR functions can be performed without any trusted service manager authentication.

The proximity payment service environment (PPSE) is a directory software application that is selected by the terminal reader when the contactless payment device is presented to the reader. Following the above functions that personalize the choice of the payment type card software application, a wallet software application can be used to send management commands, which are used to update the PPSE with the available and active card software applications in the order selected by the user.

System Architecture

FIG. 1 depicts a block diagram illustrating systems 100 for controlling multiple secure element based card software applications using a secure element based control software application according to certain exemplary embodiments. An external trusted service manager (TSM) 108 controlled by a near field communications (NFC) service provider 104 hosts and transmits card software applications for installation within the secure element 152 of a contactless smart card in mobile device 140. The NFC service provider 104 provides a secure key encrypted software card application for decryption and installation in the secure element 152. The TSM 108 includes a trusted service agent, which may be an automated software distribution entity within the TSM. In certain exemplary embodiments, the TSM may be accessible to the mobile device 140 via the Internet 132 directly, without the requirement of a mobile services provider 136 for the purpose of downloading trusted card software applications to the mobile device. The mobile services provider 136 provides card software applications in one of many mobile services protocol, such as 3G and 4G. In certain exemplary embodiments, the TSM 108 may exist as a part of the mobile services provider 136.

In certain exemplary embodiments, external application providers 112 provide card software applications to the TSM 108 for deployment to the mobile device 140. In an alternative embodiment, each of the external application providers 112, may include a TSM for providing trusted card software applications directly to the mobile device via the Internet 132 or the mobile service provider 136. Exemplary external application providers 112 include credit card companies 116 for providing credit card type payment card software applications (e.g., Java credit/debit/PayWave/PayPass type applets), ticketing companies 120 for providing tickets to events, travel, and other related functions, coupon companies 124 for providing coupons that are downloaded and scan-able at a point-of-sale (POS) using the contactless smart card, RFID tags, barcodes, QR 2 dimensional bar codes, and other similar optical coding methods, an authentication company 128 for providing authentication data that may be used to lock/unlock physical appliances or for virtual functions on computer software, and a protected information provider 121, such as a bank, merchant, or other financial service provider, for providing confidential or otherwise protected information (for example, account information), which may be used to instantiate a particular card.

In certain exemplary embodiments, an application host OS 144 on the mobile device 140 provides the user of the mobile device with the capability to manage multiple card software applications and its instances 160-164 using a wallet software application 148, where the wallet software application does not need TSM 108 permission to perform certain functions on each of the card software applications and its instances 160-164. The management of the card software applications may be performed via a control software application 156, which communicates with the wallet software application 148 using APDUs, transmitted and received, through a secure and encrypted communication channel. The control software application may freely communicate with the multiple card software applications and its instances 160-164 because each of the card and control software applications are resident within the same secure element 152. Alternatively, multiple secure elements providing a secure communication channels will provide the same functionality as disclosed herein. The user may engage the control software application 156 using commands to activate, deactivate, prioritize, delete, and install card software applications within the secure element.

When the card software applications have been activated and prioritized, the NFC controller 168 is notified of the state of readiness of the mobile device 140 for an NFC transaction. The NFC controller polls, through the antenna 172, a radio signal, or listens for radio signals from a reader terminal device 176. On establishing a channel between the devices 172 and 176, the reader requests to see the list of available card software applications within the secure element 156. A directory is first displayed, after which, based on the set priority or the type of reader, an application 160-164 is chosen and initiated for the transaction.

Figure 2:
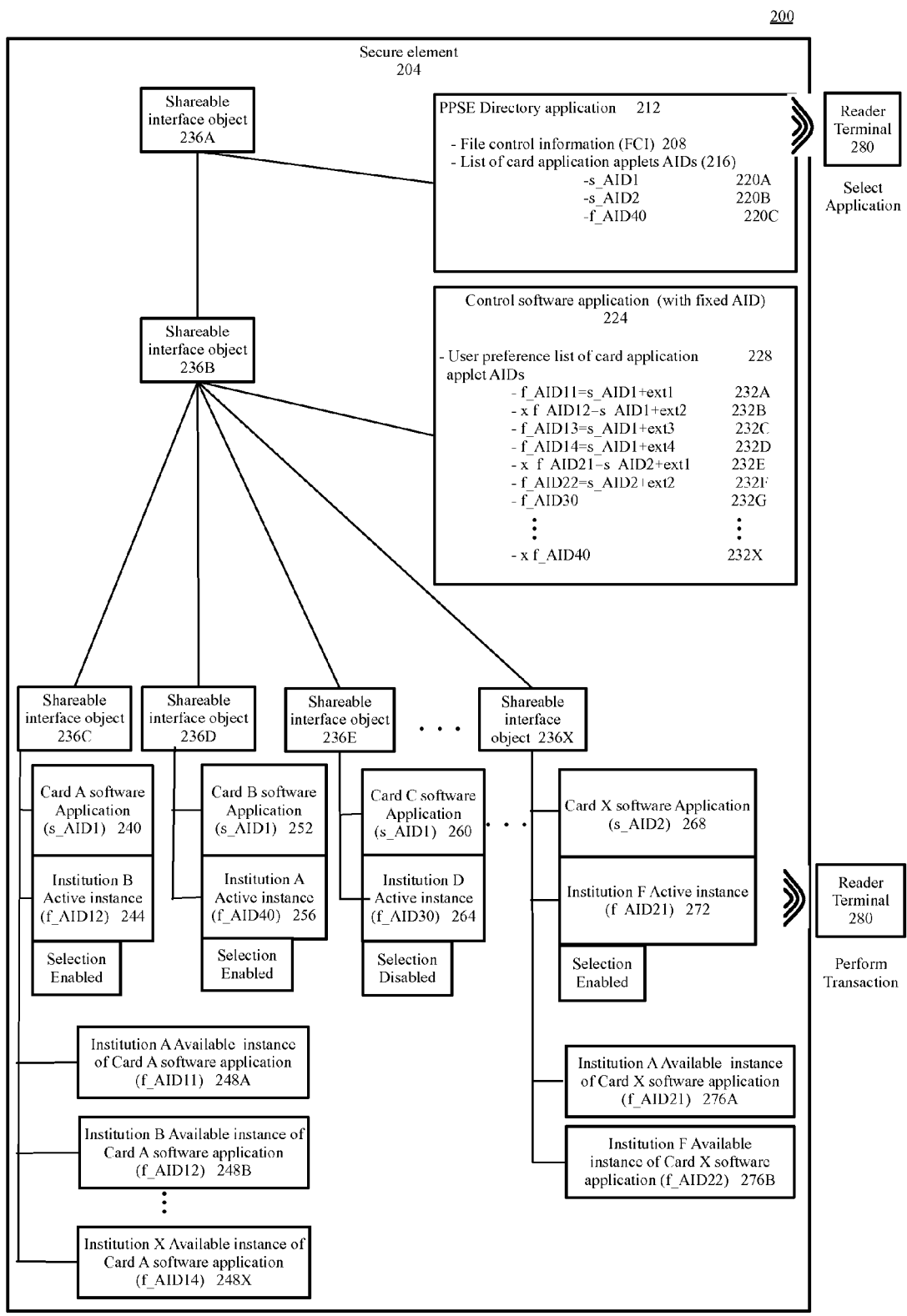
FIG. 2 depicts a block diagram illustrating a system for controlling multiple secure element based card software applications using a secure element based control software application according to certain exemplary embodiments.

FIG. 2 depicts a block diagram illustrating a system 100 for controlling multiple secure element based card software applications 240, 252, and 260 using a secure element based control software application 156 according to certain exemplary embodiments. The selections made on the wallet software application 148 via a user-interface are transmitted to the control software application 156 within the secure element 152 via a secure communication channel, and the changes are implemented into the payment type card software applications 160 and its instances 164. In certain exemplary embodiments, for a payment type card software application 160, the user may choose from different card types (for example, PayPass, Paywave, debit cards, or other types) from different credit card companies (for example, MasterCard, Visa, Discover, or other companies), as well as different bank instances (for example, Bank A, B, C, and D) for each card type on the user-interface. The wallet software application 148 manages the Control Applet 156, which is the representative of the user on the secure element 152: Accordingly, in certain exemplary embodiments, a user can perform such secure element functions as, enable or disable the contactless card software applications, configure the PPSE 212, set the priority of payment applications, set an "always on" contactless card software application, and/or set a default contactless card software application to be presented to the terminal.

In certain exemplary embodiments, the sharable interface objects (SIOs) 236A-X are used to communicated with the software applications and instances 212, 224, 240-272 within the secure element 204 of the contactless smart card. The SIOs are owned by the respective software applications and are created at the time of creation of the software applications. To share data across the software applications, the owner of the SIO is designated to be in a server mode control of the SIO, while the recipients function as the clients to the SIO. Data created by the software applications may be stored in the SIO in a recognizable format established by existing standards such as the GP and SECM standards. In certain exemplary embodiments, the AIDs of each of the applications are stored in a list format 232 in the control software application 224. The control software application includes a list 232 of the activate/inactive/non-activatable card software application AIDs in certain format. In certain exemplary embodiments, the list 232 typically includes appropriate short and full sized AIDs depending on the type of card software application. Some legacy readers with the requirement to read full sized AID require the corresponding card software application to have their full sized AID listed (e.g., 232).

In certain exemplary embodiments, the active AIDs from the control software application 224 typically updates the directory software application 212. Alternatively, the control software application may server as the directory software application with special privileges to contactless requests from a reader, and different privileges to contact requests from the user internally via the user-interface. Each card software application 240, 252, 260, and 268 may include instances of their respective applications, such as 248 and 276. The instances may share the same SIO, where the active instance takes ownership of the SIOs 236. The SIO store the application data that defines the issuer of the card software application, the user data within the card issuer application, and possibly a log of transactions tied to the specific card software application and/or its instances. When a card software application 240, 252, 260, and 268 is enabled, the SIO is active and is accessed by the client mode control software application 224. The control software application maintains a UPL 228 of a list 232 of card software applications and their status from each card software application server SIOs 236.

In certain exemplary embodiments, a reader 280 reads the secure element 204 for the first time, the PPSE 212 is read by the reader 280. The list of available card software applications 216 are displayed by the AIDs 220 to the reader. The reader then chooses or is defaulted to one of the multiple available card software applications. Accordingly, if the reader 280 chooses s_AID2 220B, then the corresponding full AID is retrieved from the control software application. The selected full AID will be f_AID21 232F. The corresponding card software application 268 is triggered and the application itself, or its instance 272, in this case, is activated to the NFC controller for radio transmission of data to the reader.

In certain exemplary embodiments, the user may configure the list in the control software application 224, using the wallet application on the user-interface, where the wallet application sends APDU instructions to the control software application 224 to perform a function on the selected card software application or its instances 240, 252, 260, and 268, or the UPL 228 on the application 224.

In certain exemplary embodiments, in the case that the user chooses not to enter a PIN prior to payment, the settings for such processes can be controlled by the user. In case the mobile is powered off and running in virtual card emulation mode where the secure element is powered by the field, the control software application may not access the control functions defined within the device. Implicit access control is provided by the owner of the contactless payment device.

Additionally, in certain exemplary embodiments, only the contact interface performs management commands, and the control software application applet does not have any influence on functionality or security of card software applets. The management commands may be primarily capable of enabling or disabling the selection of the payment application and updating the PPSE file control information (FCI) 208 for the application lists 216. The control software application 224 is assigned a specific fixed AID and can be called by the external wallet application for selection. Internal to the smart card, the control software application AID may be used by a card software application 240, 252, 260, and 268, in the server mode (for sharing of data object SIOs as previously discussed), and may have AIDs designated by the operating system of the JCRE (at installation of the card software application) in the absence of an assigned AID. The server mode card or control software application can then verify the AID. The control software application may be the client software application for SIO purposes in event notification functions, for example, instantiation of new contactless payment applications, deletion of instantiation applications, and transaction events, like payments.

The user preference list (UPL) 228 stored within the control software application 224 as previously discussed may be implemented using registry tags. Information contained within the UPL is illustrated in Table 1 according to certain exemplary embodiments. The items marked "User Defined— UD" are accessible through the secure firewall using the SIOs. The other items are not accessible to the user or other applets, thereby reducing any risk of including data security. In certain exemplary embodiments, the use of a PPSE directory software application 212 for card software application lists may be merged with the function of the UPL 224 of the control software application 224, thereby creating a single list which can be accessed by the user-interface via the secure communication channel In this embodiment, changes made by the user to the list on the user-interface can be used to update the UPL on the control software application which is then made available to the reader when the reader terminal requests a list of active applications on the contactless mobile device.

The exemplary parameters in the UPL in Table 1 may be accessed through a GET STATUS and SET STATUS command issued by the control software application. The appli-

TABLE 1

| Application related data: 61 | | | | |
|---|---|---|---|---|
| AID: 4F | (ES) | A00000000310100 | A000000004001010 | A0000000043060 |
| Application Short File ID: 94 | (ID) | 1 | 2 | 3 |
| Priority: 81 | (UD) | 2 | 1 | 3 |
| Lifecycle: 9F70 | (ES) | SELECTABLE ACTIVE | SELECTABLE NOT_ACTIVE | SELECTABLE ACTIVE |
| Update Caudal: 80 | (ID) | 2 | 6 | 1 |
| Discretionary Data: A6 | | | | |
| MC indicator: AA | (ID) | false | true | true |
| Payment system: AB | (ID) | VISA | MCCREDIT | MCDEBIT |
| Issuer: AC | (ES) | BOA | CITI | WF |
| 'AlwaysOn': AD | (UD) | true | false | false |
| Event logging list: A7 | | | | |

| Global Event Sequence Counter: A9 (ES) | | |
|---|---|---|
| 16 | | |
| Event: AF | | |
| Short File ID: 94 (ID) | Sequence Counter: A8 (ID) | Event ID: AE (ES) |
| 2 | 12 | 1 |
| 1 | 13 | 3 |
| 1 | 14 | 6 |
| 3 | 15 | 2 |

Codes: Externally supplied - ES
Internally derived - ID
Use defined - UD

In certain exemplary embodiments, external commands formatted to the control software applet may be represented by Global Platform (GP) 2.2 standard. The GP 2.2 standard defines Java Card API standards for applets within the secure element. This will allow an easier transition for the next Java Card Open Platform (JCOP) platform for supporting updates and amendments. As shown in Table 1 above, the event logging list can be used to trace the payment events, installation of bank instances, and deletion thereof. The Global Platform type control software application can include a standard format based on the Secure Element Contactless Management or SECM in the Europay, MasterCard, and Visa—the EMV standard, or contactless registry service (CRS), which is GP standard terminology. Further, the card software applet in certain exemplary embodiments is defined to work with both, the GP standard and a SECM standard, where each standard supports a type of on-card software application management. The control software application can implement an APDU instruction set to perform the following exemplary functions per the request of a wallet application: get non-secure information on registered contactless card and external software applications (via the AID of the card software application) and their respective contactless registry information (GP standard reference for the UPL); activate/deactivate contactless card software applications; and respond with a list of conflicting application AIDs, where the APDU also establishes the order of applications in the UPL registry of the control software application by receiving a list of application AIDs. Additionally, some exemplary modules have AIDs that are reserved by the GP standard for the purpose of installing the control software application, including an executable load file AID, an executable module AID, and an application AID. The control software application may typically process the APDU commands, therefore providing the user with expected management capabilities via the user-interface.

cation AID tag "4F" may be a tag within the contactless registry UPL. Partial AID matching is supported when this tag is used as a search criterion in the GET STATUS command. If a length for the AID is not specified in the GET STATUS command, then a complete contactless registry UPL may be returned. In an exemplary embodiment, the GP control software application can be resident outside the security domain because the definition of the GET STATUS and SET STATUS commands require access to only the non-secure status information and not the actual secure data. Application short file ID defines the local namespace of the contactless registry UPL. This item is used by the event logging list to map an application identifier to the software application that produced the event. Priority indicator defines the order in which the payment applications are represented in the PPSE. An entry of "0" means that the respective contactless card software application is not accessible over the contactless interface, for example, the card software application may be disabled by the user or locked by the issuer.

In certain exemplary embodiments, the Application Lifecycle State tag "9F70" provides the application lifecycle state on the first byte as defined in GP2.2 standards. The Contactless Activation State may be encoded on the second byte as defined in GP2.2 standards. The software application discretionary data may be accessible to the wallet application through the control software application, for proprietary usage. In certain exemplary embodiments, if the card software application belongs to MasterCard, a MasterCard indicator may be set in the corresponding cell of Table 1. The tag for the control software application can execute logic on the short-size AID limitation on legacy readers. Value coding may be on one of the tag byte as follows: "A5" indicates not in MasterCard payment system, i.e., false, while "5A" indicates a MasterCard payment system instance, i.e., true.

In certain exemplary embodiments, the system indicator tag codes in Table 1 are provided in ASCII used by the payment system, for example, "VISA." The issuing bank tags can be coded in ACII, for example, "CITI." The mechanism to determine the issuer can be done by either using information provided by the trusted service agent (TSA), which is a trusted service manager (TSM) owned off-card software application on the payment device (or wallet application), or information coded in the payment application's PIX. In certain exemplary embodiments, the "Always On" feature from the payment card software application describes a state where a contactless card software application that is activated on a payment device is accessible to a contactless terminal as long as the mobile device is capable of communicating over the antenna interface, even when the payment device is not "switched on". A card software application in the "Always On" state can be equated to a regular contactless card in that the only action required from the mobile device user to initiate a contactless transaction is the act of presenting the contactless payment device to the contactless terminal. Conversely, a contactless payment card software application that is not in an "Always On" state would need the consumer to take a conscious action on their payment device to make the application accessible prior to the act of presenting the mobile payment device to the contactless terminal. As an example, setting byte data to "A5" in Table 1 indicates not an "always on" or false state, while "5A" indicates "Always On" or true state.

The Event logging list in Table 1 includes recorded transaction events. The on-card software application resident in the secure element initiates an event, for example, a PayPass event, where the last transaction command could signal a payment attempt. In order to support the GP standard, the CRS version of the control software application will reference the contactless registry UPL using the short file application ID and record the global sequence counter value at the time of event. An event ID (identifier) signals what type of event occurred. Events may be triggered by the payment type card software applications that are activated on the mobile payment device. The following events are exemplary events that may be registered in this list, where the byte code is coded in the event ID, for example, application INSTALL—tag, 01, application DELETE—tag 02, application SELECT: 03, application BLOCKED: 04, application UNBLOCKED: 05, PIN VERIFIED: 06, PIN FAILED: 07, and Payment transaction: 08.

Event sequence counter, short file ID, or Event ID are chronologically numbered in the event logging list. The value of the global event sequence counter is recorded, together with the short file ID. Then, events can be identified in order. Event ID specifies what type of event occurred. The Global Event Sequence Counter is a short number, recording the number of all events that occurred. An unsigned overflow is allowed to occur (at a range of 65000 to 0). The trusted service agent (TSA) are software applications within a trusted server manager (TSM) that manage deployment of card software applications to the secure element of contactless smart cards. The trusted service agent (TSA) also manages updates to the deployed card software applications in a remote contactless payment device's secure element based on requests from the user of the contactless payment device or an issuer of the TSM card software application. The UPL in the control software application is self-contained using notification mechanisms through the SIOs.

In certain exemplary embodiments, the control software application SIO uses Shared Notify Service Interface, which is a shareable (tagging) interface for notification of SIO data. The following methods are accessible by card software applications in the format of "notify(AID aid, short event)": application INSTALL: 01; application DELETE: 02; application SELECT: 03; application BLOCKED: 04; application UNBLOCKED: 05; PIN VERIFIED: 06; PIN FAILED: 07; and Payment Transaction: 08.

Figure 3:
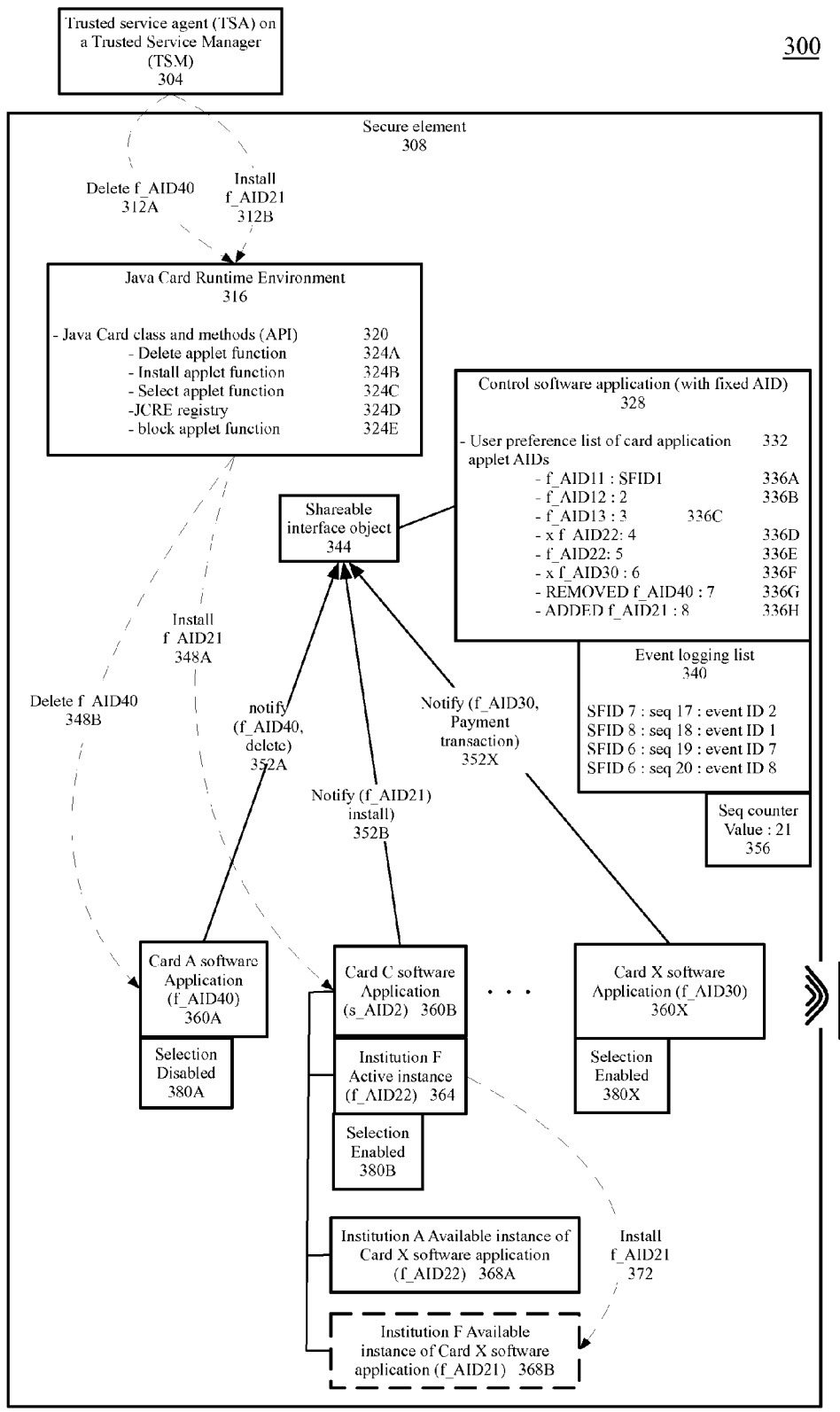
FIG. 3 depicts a block diagram illustrating a system for event notification using a self-contained control software application according to certain exemplary embodiments.

In certain exemplary embodiments, the control software application may implement the Shared Notify Service Interface by itself. When a notify message is triggered, the control software application runs instruction based logic to update the UPL. FIG. 3 depicts a block diagram illustrating a system for event notification using a self-contained control software application according to certain exemplary embodiments. A trusted service agent 304 sends a one of a number of available requests 312, along with the AID and a card software application for installation, deletion, or another function, each to be performed within the secure element 308 of a contactless smart card. In certain exemplary embodiments, the install application 312B request is received via the JCRE 316. The JCRE 316 includes API classes and methods 320 and 324 to perform the functions requested by the TSA 304. For an exemplary install function, an install instruction 348A is sent to the card software application represented by the short AID of the full AID reference used in the TSA request (312B). In certain exemplary embodiments, the card software application for card type C 360B is chosen to receive the API function call from the JCRE 316 because the full AID the received request includes the short AID of the selected card type C 360B. This indicates that the received software application may actually be an institutional instance of an existing card software application. The card software application 360B initiates the installation of the instance of the card software application as received within the secure element.

In certain exemplary embodiments, upon installation, the card software application notifies the control software application 328 of the newly installed instance of the card software application. The card software application may simply trigger a method call 352B with the card software Java applet using the full AID of the instance, along with an event ID to indicate the function 352 performed on the instance (e.g., install, delete, etc.). The control software application 328 adds 336H the AID of the payment card software application or a card software application instance to the UPL 332. In certain exemplary embodiments, the card software application applets 360 access the control software application SIOs 344 from a constructor class instance of the card software application 328, thereby triggering the instantiation event for notification of deletion 352A, installation 352B, transaction 352X, and other related functions 352.

In certain exemplary embodiments, to ensure the constructor instance is not throwing an exception during instantiation (for example, if an algorithm including a function requested by the TSA is not supported or the contactless smart card memory is not sufficient), event notification 352 can be done after JCRE registration of the instance (register method) 320. In certain exemplary embodiments, for MasterCard owned card software application instances e.g., instance 364, the event for notification 352 can be triggered by a generic software application upon creation of the instance, where the generic software application masks the full AID to support short and long AID implementations from the terminal reader's that reads only the full or only a short sized AID. For the DELETE function 348, the secure element 308 operating system OS receives a JCRE 316 function 348 which marks the card software application instance or the whole card software application package for deletion. If open references are not found, the deleted applet is removed from registry 328 and the memory is freed by the OS. The JCRE 316 provides an AppletEvent method "uninstall," which is called, if implemented, before a card software applet 360 is deleted. The "uninstall" method allows the instance to execute maintenance before removal. As an example, references can be set to null, or in this case, notification 352 is sent to the control software application 328 that the instance 364 has been deleted. The control software application then removes the deleted payment card software application entry (AID) 336G from the UPL 332. As such, this removal allows synchronization of the UPL 332 against the actual JCRE registry 324D supporting the notification event mechanism.

A card software applet can trigger an event to the control software application 328 through its SIO 344 using an applet defined uninstall method using the JCRE APIs. For MasterCard owned banking instances, for example, the generic software application applet signals the removal of an instance (by setting it to "null" and clearing all data). During SELECT, the payment card software application 360 notifies the control software application 328 that the payment card software application 360A-X is selected. The control software application 328 updates the event logging list 340 accordingly and a sequence counter 356 notes the notification. The AID can be provided as a parameter within the notification 352A-X to the control software application 328 for performing the selection. However, for a MasterCard bank instance, the full-size AID can be included in the notification as the server mode SIO may not determine the bank instance masked by the payment card software application's short AID. In certain exemplary embodiments, this solution applies for legacy readers, where legacy readers are unable to read the short-sized AID. For non-MasterCard payment applications, the AID can be retrieved using JCSystem.getPreviousContextAID method in the SIO java card functions of the JCRE 316. After finding the AID of the client of the SIO, the control software application 328 searches through all AIDs in UPL 332 and maps it to the corresponding short File ID (SFID).

In certain exemplary embodiments, for the UNBLOCKED/BLOCKED functions from the JCRE 316, based on requests from the TSA 304 may be rendered on a selected AID of the card software application 360 for blocking. The instruction for blocking or unblocking may be defined by the control software application 328 using APIs from the JCRE that causes a selected card software application 360 to trigger an event to the control software application 328. Simultaneously, another instruction is executed, for example, to remove the card software application instance from PPSE or the JCRE registry 324D, and to clear "AlwaysOn" for the blocking event. For the PIN VERIFIED/PIN FAILED functions, the payment card software application 360A-X informs the control software application 328 about the status of the card software application post rendering of the function. The TSA 304 will interface directly with the payment card software application 360 for PIN processing. The wallet application on the mobile device OS also has a method to gather a PIN processing state using the UPLs 332 event list and the APDU disclosed previously. In case of payment transaction commands, a payment card software application 360 can trigger a function to add a transaction event 352 as a notification to the event logging list 340 of the control software application 328. The timing of the event notification is defined by the card software application, for example, it can be during the selection of the card software application or after the last command processed on the secure element.

System Process

In certain exemplary embodiments, external commands available for the CRS (GP control software application) include a SELECT command. The SELECT command initiates the CRS to return file control information (FCI) signaling the version number and global event sequence counter. Here, the data may include the CRS AID, which can be the AID for the control software application. The response to the command is tag "6F": FCI template, tag "84": CRS AID, tag "A5": FCI Proprietary Template, tag "9F08": version number (2 bytes), Value "01" "00," tag "A9": Global Event Sequence Counter (big endian). To obtain a CRS registry entry, the GET STATUS command is used. This command retrieves the CRS registered contactless applications, the Lifecycle status, and other information according to the given match/search criteria. Data on non-contactless payment applications may not be available through this command (for example, the CRS control software application itself cannot be mined). Authentication is not required to process this command. Data secured is of the format tag "4F," full-size AID, partial AID, where "4F" "00" means complete registry. An alternative response could be "registry entry": "none" if not found; if found, the data is encapsulated in the application related data tag "61" for the certain exemplary conditions including, one applet in case of full-size matching AID, one or more applets in case of partial AID match, and a complete registry if no AID specified.

Figure 5:
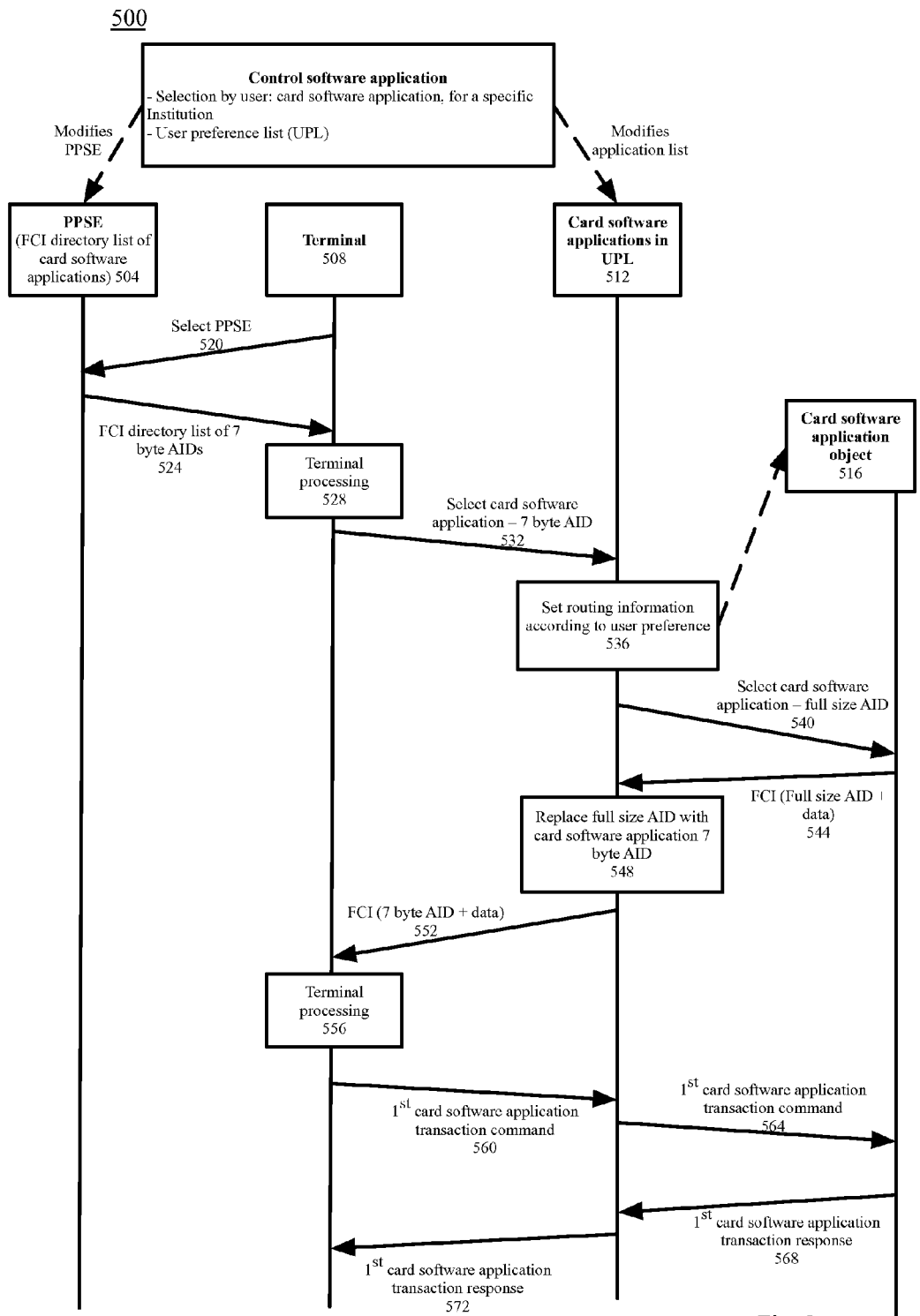
FIG. 5 depicts a flowchart illustrating a method for controlling multiple secure element based card software applications using a secure element based control software application according to certain exemplary embodiments.

The SET STATUS command may be used to modify the "Availability State" of the CRS registered contactless software card application(s), and the priority assigned to the active application list in the PPSE or the FCI. In addition, the SET STATUS command can be used to globally switch on/off the contactless interface. The SET STATUS command may be limited in terms of modification options offered to non-contactless application data. Further, authentication may not be required to process this command. The data targeted by the SET STATUS command for one or more application AIDs includes information corresponding to contactless interface activation/deactivation status, application lifecycle state, and application discretionary data. The response to the command may either be an "OK," data/signal when the user preference is rendered, a "warning" data/signal when conflict resolution is successful where user preference is executed partially, and/or an "error" data/signal when conflict resolution fails, where, the previous user preference is still active. This process is illustrated in FIG. 5.

In certain exemplary embodiments, for the GP specification of a payment environment, an internal method call in the PPSE towards the control software application applet typically modifies the FCI. By way of an example, a function, "setFci(byte[ ] aidList):void", may be defined that lists parameter AID including tag length value (TLV) of the coded AIDs, where the coding may be defined according to the EMVCo contactless specification. A clearFci( ) void function may be defined for clearing the FCI content in the PPSE. However, for EMV compliant terminals, the PPSE may not show any payment applications on the secure element for this method, and a direct read is performed to an active card software application as illustrated in FIG. 3.

In certain exemplary embodiments, the JCRE or the control software application may include internal method calls toward each of the payment card software applications. When the payment card software application does not belong to the MasterCard payment system, the AID parameter and its length may not be of relevance for the reader and internal card software application selection. The selection of the card software application may be enabled or disabled accordingly. In case the card software application belongs to the MasterCard payment system, a generic software application locates the institution (e.g., bank, stores, etc.) instance of a card software application according to the AID parameter. In certain exemplary embodiments, the internal method calls applicable may include such custom functions as, a enableSelection(byte[ ] aid): Boolean, for enabling selection of a payment card software application and returning values as true if enabled or false for a general error (for example, the applet is locked). Another exemplary method call includes the disableSelection (byte[ ] aid): void, which disables selection of a payment type card software application.

Further, FIG. 3 also illustrates a standard payment transaction and related event notification using a payment type card software application, where the payment is processed as defined by EMV standards to support existing readers 376 according to certain exemplary embodiments. Payment type card software applications allow a selection and a transaction over a contactless radio interface. In certain exemplary embodiments, using the terminal 376 selects either the PPSE or an activated card software application 360× and receives the FCI from the PPSE listing the available card types by the AID. In certain exemplary embodiments, the terminal reader 376 may make a default request for a particular card software application. For MasterCard payment applications, in view of the previously described legacy ready issues, the reader terminal matches short-sized AIDs of the MasterCard payment application. The terminal then selects the matching short-sized AID of the MasterCard payment application. Upon receipt of a SELECT command, the MasterCard applet checks if an active bank instance exists, and if yes, then the payment card software application sets routing information for commands to the active bank instance. The SELECT command is forwarded to the active bank instance. If the response is modified, the application exchanges FCI with the short-sized AID of the MasterCard payment application. This response is communicated back to the terminal. If an active bank instance does not exist, the same error status is returned to the terminal as for non-existent AIDs on the card. Thereafter, all proceeding commands and responses are routed to the selected bank instance.

For non-MasterCard payment applications, the terminal will match full-size AIDs, and will select a full-size AID of the payment application. Upon receipt of a SELECT command, the payment card software application checks if selection is enabled, and, if yes, initiates processing functions as previously discussed. If the selection is disabled, the same error status is communicated to the terminal as is returned for non-existent AIDs on the smart card. For access purposes, in an exemplary embodiment, only the wallet application can access the control software application externally. An access control is not needed for any other application, and indirect access control is limited and exercised by the use of a contact interface, ownership of the contactless payment device, or security features on the device, such as hiding API access to the secure element. Additional security can include adding PIN verification, among other methods. The control software application does not exhibit the UPL or any other information internally. The control software application uses UPL for the decision process, for example, what payments applications should be updated with active/inactive (activated/deactivated) information and what content should PPSE exhibit to the terminal. To perform this function, the application follows the SIO method by acting as the client and accessing information via the SIO PPSE and payment applications.

Compared to the PPSE in a card form factor, the PPSE in a mobile contactless payment device may not be static. The user preference for a specific payment instrument may be applied by activating and deactivating certain payment apps and also, by exhibiting directory of available card software applications to the terminal. Such a directory may be contained in the FCI of the device PPSE. The PPSE functionality may conform to the definitions of the EMV specifications in order to support legacy readers. For mobile contactless payment devices, the PPSE can be updatable. In certain exemplary embodiments, the update process is handled internally through the control software application. The EMV approach makes the update process configurable directly using the user-interface, i.e., the wallet application, on the mobile device. The EMV contactless mobile specification commands "PUT TEMPLATE" and "GET TEMPLATE" can be mapped to SIO methods for the control software application. The FCI in the PPSE can be a list similar to the UPL list; however, some differences may be related to the strict structure as defined by EMV, where full-size AIDs of MasterCard payment applications' bank instances may not be listed. Instead, only the first 7 bytes are listed. In this manner, a subset of the UPL is listed (in case the UPL includes strict EMV structure with extensions such as "AlwaysOn."). This listing is illustrated in FIG. 2, where the directory software application 212 includes a list of short and full sized AIDs 220. When the application 212 is presented to the reader device 280, the reader device may select an application according to the pre-set reader designations or the availability of the active card software applications 240.

In certain exemplary embodiments, the PPSE FCI 212 is accessed for reading through the contactless interface, and is not access controlled to support legacy type readers with EMV specifications. Here, all the data in the PPSE may not be distributed to merchants' reader by default, but is available to the user for selection via the user-interface. The user may choose to use the access functionality for specific payments on short distance contactless communication with a specific merchant terminal. The wallet application user-interface may implement configuration options for the data included in the PPSE, where the data can be further distributed, for example, using loyalty programs or pinpointed advertising.

Application Lifecycle Management of on-card application lifecycles are defined in GlobalPlatform (GP) specifications, specifically for contactless in GP 2.2. In certain exemplary embodiments, the existing card lifecycles may be coded on the first byte, while the second byte defines a contactless activation state. The additional three contactless activation states are "ACTIVATED," "DEACTIVATED," and "NON_ACTIVABLE." The contactless activation state byte may be encoded independently of the application lifecycle state byte. The value of the contactless activation state byte can be retrieved independently using the GET STATUS command from the CRS control software application. A card software application currently in the "ACTIVATED" state is able to communicate through the contactless interface. Conversely, an application currently in the "DEACTIVATED" state may not able to communicate through the contactless interface. An application in the "NON_ACTIVATABLE" state is implicitly DEACTIVATED due to some internal reason known by the application or its provider (for example, a possible attempt of fraudulent use), and cannot be ACTIVATED by the control software application. Any attempt to activate an application that is currently in the NON_ACTIVATABLE state typically fails.

In certain exemplary embodiments, transitions between the three contactless activation states abide by certain rules maintained by the control software application. In an exemplary rule, an application may always able to transition itself into the "DEACTIVATED" state automatically. In another exemplary rule, an application cannot transition itself into the "ACTIVATED" state without user permission and in yet another rule, an application may transition itself into the "NON_ACTIVATABLE" state at any time, thereby indicating to the OPEN that it is both deactivated, and not in a suitable internal state to become ACTIVATED on the contactless interface. Further, an application may be able to transition itself from the NON_ACTIVATABLE state to the DEACTIVATED state, thereby indicating to the OPEN that it is in a suitable state to become ACTIVATED again. In addition, certain rules may also be applied to the lifecycle process for communication with the contactless interface. In one exemplary rule, an application may not communicate through the contactless interface if it is not in a selectable state (in particular, when the application is in the LOCKED state). Further, when an Application is unlocked, the contactless activation state remains in the same state as it was prior to being in the LOCKED state, which means that the wallet application should be cautious while setting the contactless activation state to DEACTIVATED.

In certain exemplary embodiments, personalization of certain card software applications may not be compliant to EMV and other payment system standard specifications. This may be a result of the application objects that are created, and may not be directly available for use via a full-size AID compared to a payment card software application on a card (form factor). MasterCard in legacy reader devices may not support short-sized or partial AIDs. A personalization flow modification and personalized commands can be considered in this case. In certain exemplary embodiments, support for legacy readers can be implemented on a personalized PPSE. The card software applications that access the issuer secure domain (ISD) of the contactless smart card can be accessed for customized GP API creation using the issuer secure domain (ISD) keys. The personalization method, in certain exemplary embodiments, is performed by injecting personalization keys encrypted with an ISD data encryption key (DEK) to the ISD to access existing card software applications. A payment card software application may be selected and authenticated using the personalization keys for customization purposes.

In certain exemplary embodiments, the personalization of the selected payment card software application may be implemented by changing the FCI tag 208 and other accessible data upon gaining ISD access. Further, the personalization phase for a payment card software application can then be disabled to complete functionality of the personalized software application within the secure element. An INSTALL function for install and selection of the application is applied to the personalized card software application. The INSTALL function is the GP command handled by a payment card software application to instantiate a bank object, which, in this case, is a full-size AID included in the INSTALL command. A new command may be created to describe this same function for the purposes of personalization of the card software applications. The payment card software application notifies, via the SIO, internally, to the control software application of successful instantiation. In another exemplary embodiment, a second new command may be instituted using the available APIs for selection, by file, of the personalized card software application's data object with full-size AID. The selected data object can be routed by the secure element OS to the payment application. The personalization script for a selected card software application may be created according to the payment system specification to be supported by the software application. A final personalization command may be applied to disable (or terminate) the bank object personalization phase. While the payment card software application may not be personalized afterwards, it is an option to allow bank object instantiation and personalization during post-issuance.

In certain exemplary embodiments, deletion of a card software application involves sending the DELETE command directly to the card software application. The data field of the command contains the AID of the instance of the card software application to be deleted. In certain exemplary embodiments, only a full-size AID is accepted to identify the exact instance for deletion. In certain exemplary embodiments, to delete a card software application instance, a card software application is selected and authenticated using ISD keys, where the card software application accesses the ISD in the secure element using GP APIs defined by the JCRE. The GP's DELETE [AID] command may be executed, and the card software application clears all instance specific data, where the data is not shared. All the session data is cleared to 0s. The secret keys are overwritten with 0s and the transient keys, transient data, and persistent data are set to null. The set instance is also set to null and the garbage collector method is called for cleanup. The card software application then notifies the control software application about the deletion using the SIO.

In certain exemplary embodiments, all card software applications other than the MasterCard type card software applications may be allocated a memory size limitation. The persistent memory typically stores code and data, while transient memory can provide such data as the number of instances of card software applications available to the user. For example, only two MChip instances may be installed within the smart card. Further, it may be possible to free memory for a removed payment application, but it may not be possible to free memory in the secure element for a deselected application. When only one card software application and its instance exists, then the AID length can be set to a default at 7 bytes, while more than one instance changes the AID length requirement to 8 bytes.

In certain exemplary embodiments, the systems and methods of implementing a secure element control software application to control the PPSE and the individual card software applications, and the process of personalizing payment applications to conform to the control software application, may be described in a service level agreement (SLA) between the control application owner and the payment card software application owner. The SLA defines the level of personalization and interaction allowed between the payment card software application and the controller application. The SLA defines business rules that will be automatically implemented when the payment device owner selects a payment card software application for installing on the device from a trusted server. As illustrated in FIG. 1, the control software application in the secure element interacts with the wallet application, where the wallet application is available to a user via a graphical user interface (GUI) of the contactless payment device. The wallet application secures data from the secure element and displays aggregated payment options to the user. The SLA defines business rules to control the payment card software application priority with respect to the reader terminals at points-of-sale. The control software application can prevent the reader terminal from applying certain forceful methods to select a payment card software application from a list of available options. For example, the control software application can prevent readers from choosing a certain credit card application over a different credit card application.

Figure 4:
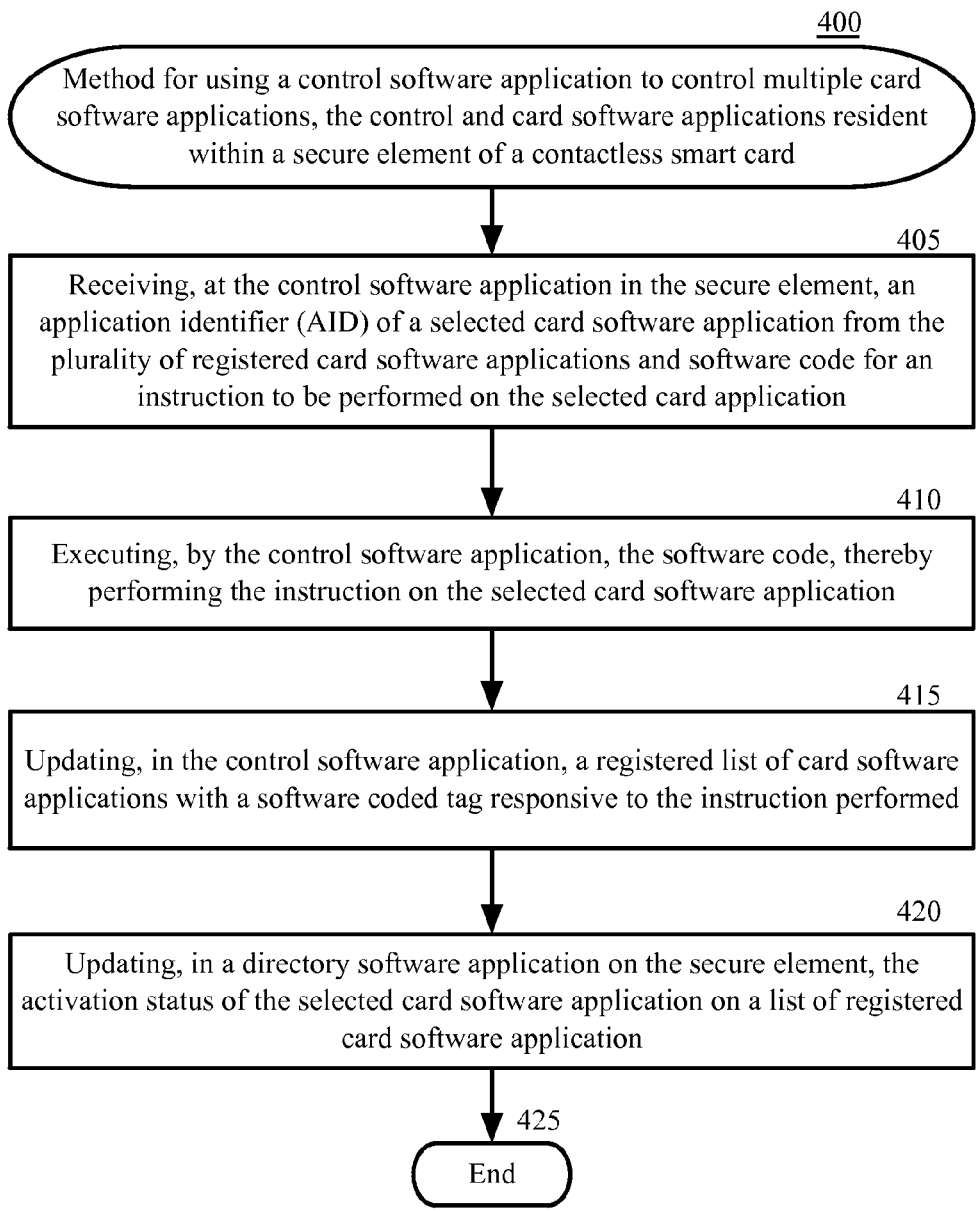
FIG. 4 depicts a flowchart illustrating a method for controlling multiple secure element based card software applications using a secure element based control software application according to certain exemplary embodiments.

FIG. 4 depicts a flowchart illustrating a method 400 for controlling multiple secure element based card software applications using a secure element based control software application according to certain exemplary embodiments. The method includes receiving a card software application AID and a software code for an instruction to be performed on the selected card application applet as represented in block 405. In block 410, the received software code instruction is executed within the secure element to perform certain functions on the card software application represented by the received AID.

In certain exemplary embodiments, the received software coded instruction may be a short software coded remote method invocation (RMI) to an existing API within the secure element to perform a function on the selected card software application. In another exemplary embodiment, the software coded instruction may be the function itself that is rendered within the virtual machine in the secure element of the smart card. Further, if the software coded instruction is received from the wallet application, then the instruction is in the APDU format, and may be issued to a process method of the card software applet representing the selected AID. The instructions may include at least, "install," "delete," "activate," "deactivate," and "prioritize." The prioritize instruction contains information on where to place the selected card software application from among the list of registered active card software applications.

Block 415 triggers an update to the registered list 332 of card software applications stored with a software coded tag responsive to the instruction performed. The tags are stored in the event logging list 340 as depicted in FIG. 3. The updated list of the card software application is synchronized, via an update, block 420, with the PPSE list, or in the alternative, the PPSE list is directly altered to reflect the changes requested by the software coded instruction. In certain exemplary embodiments, the software coded instructions are rendered via the control software application to the list of registered applications within the PPSE applet, thereby eliminating the redundancy of a UPL and a PPSE based FCI list.

FIG. 5 depicts a flowchart illustrating a method for controlling multiple secure element based card software applications using a secure element based control software application, block 500, according to certain exemplary embodiments. A user request on the user-interface of the control software application in block 500 modifies the PPSE in block 504 and the UPL in block 512. The PPSE in block 504 may be indirectly updated using a synchronization of the updates made to the UPL in block 512, after updating the UPL. The terminal reader represented by block 508 polls for radio wave based devices in the vicinity of the reader. When the reader device appears, the reader in block 508 requests the root or default directory, the PPSE block 520 in this case, for analyzing the transaction options available to the reader.

In certain exemplary embodiments, the FCI directory list is returned to the user in short sized (7 byte) AIDs depicted in block 524. The terminal process in block 528 analyzes the data received and selects a 7 byte AID among the FCI list. The selected 7 byte AID is sent, referenced in block 532, to the card software applications list (UPL) in the control software application. In block 540, the selected short AID is compared to the UPL list to retrieve the full size AID related to it. The SIO of the selected full size AID is accessed via a client mode function for the control software application and the full size AID with SIO data is returned to the control software application, per block 544. The full size AID is exchanged for the related 7 byte AID, and the data, along with the 7 byte AID, is transmitted to the terminal for processing, block 556. The 7 byte AID and its related full sized AID are then used for the next set of card software related function transactions with the UPL providing the exchange of short and full size AID at each transaction process shown in blocks 560-572.

Figure 6:
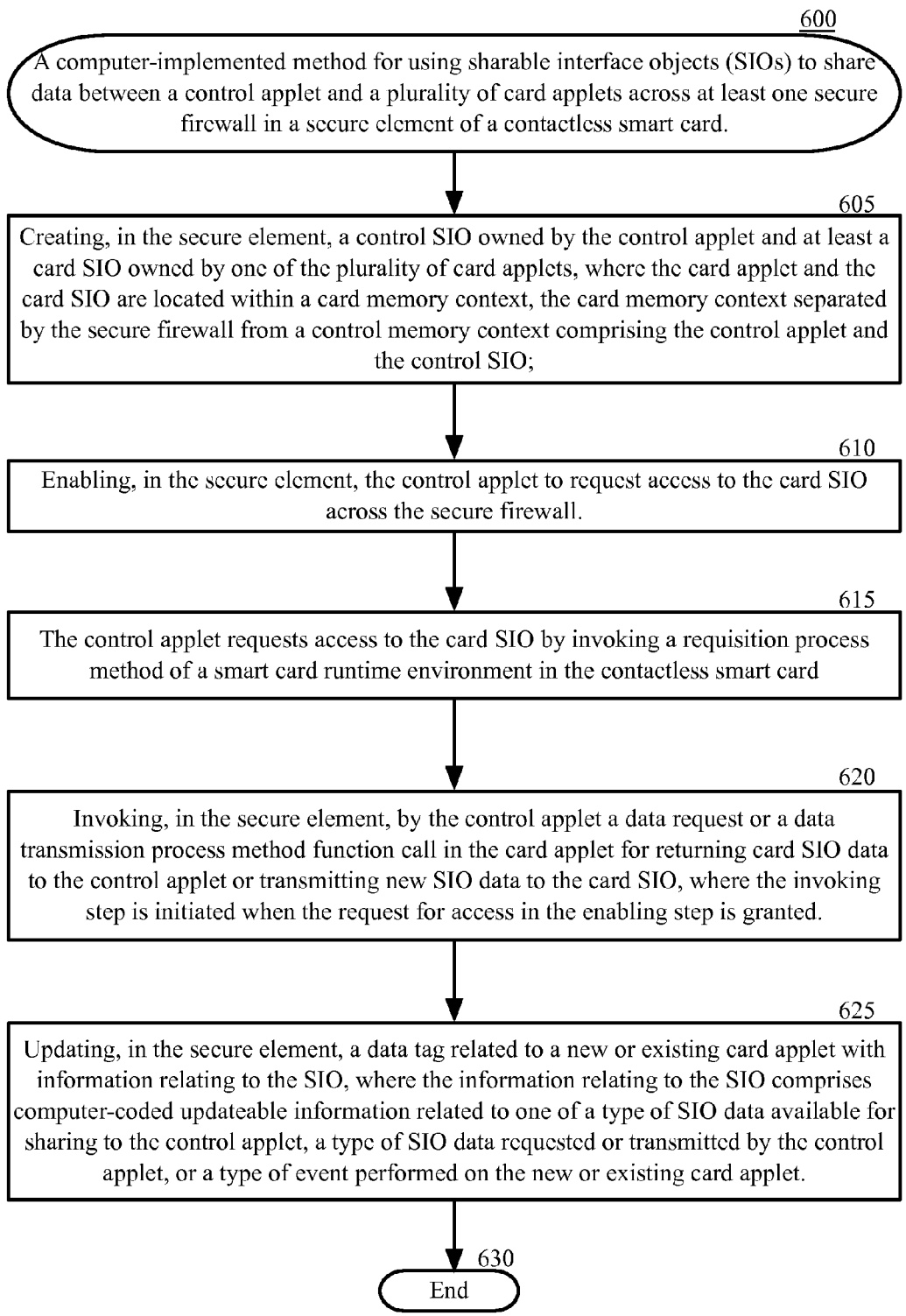
FIG. 6 depicts a flowchart illustrating a method for using sharable interface objects (SIOs) to share data between a control applet and multiple card applets across at least one secure firewall in a secure element of a contactless smart card.

FIG. 6 depicts a flowchart illustrating a method 600 for using sharable interface objects (SIOs) to share data between a control applet and multiple card applets across at least one secure firewall in a secure element of a contactless smart card, according to certain exemplary embodiments. The contactless smart card includes a number of software applications, each designed to perform certain pre-defined tasks. By way of an example, a directory software application (e.g., the PPSE) may be accessible to an external card reader to present the reader with options of the active card software applications available for transactions from the contactless smart card. The card software applications communicate with an external card reader to provide credit/debit account information, coupon information, membership information, loyalty information, and other related applications via APDU commands as described above. A control software application communicates with the card software applications and also may communicate with an external software application outside the secure element, e.g., a user-interface software application rendered on a contactless payment device that is in electronic, optical, or radio contact with the contactless smart card. In one example, a contactless payment device may be a mobile phone, while the contactless smart card may be incorporated within a SIM card, U-RIM card, an embedded chip or an external SD card, or any type of smart card, as discussed above.

The control software application 224 in FIG. 2 communicates via SIOs 236 with the card software applications 236 (shown as the "card software applications"). Each software application, for purposes of transaction, control, directory, or any other smart card function is loaded into the smart card as an application package. The application package includes multiple computer-coded files for installation within the smart card. When installed in the secure element, the application package creates its own SIO within an application memory context assigned to the application package by the runtime environment of the smart card. The creation of SIO related to a control applet and at least one card applet is depicted via block 605. The application memory contexts are independent object spaces defined by a firewall that separates each of the contexts. By way of an example, a Java card runtime environment (JCRE) allocates an area within the smart card memory for storing the application package and associated data objects. When an application package renders within the runtime environment of the smart card during execution, the application generates data that is stored within the fields of the associated data objects. Each of the allocated application memory contexts forms a secure and isolated memory area for the overlying software application and data object. For a software application instance that is installed within an existing application package, the application instance and the SIO of the instance share the same context with its parent application package. In the Java Card implementation, the application package is a class file and the application instances are instances of the classes.

When applications and their instances reside within the same context, the SIOs related to the application and their instances may be shared by each of the other instances within the context without special access requests. Accordingly, a card software application, which in a Java Card implementation is a card applet, may obtain data from SIO fields of other instances of the card applet by requesting the data directly from the parent applet that owns the SIO. However, when for application packages that are installed in one application memory context, their SIOs are limited for access by firewalls of the application memory context. In an exemplary embodiment, block 610 depicts the step in method 600, for enabling applets to request for access to SIOs across a firewall, where the requisition is implemented via block 615, using process method function calls of the runtime environment. Accordingly, a software application or its instance that resides in a different application memory context has to perform a client role by initiating an access request via the runtime environment process method function calls to a server card applet including the intended SIO data to be accessed across the firewall. After access is granted, block 620 depicts a method step, where the client software application may invoke process method function calls in the server applet to access the data in the server applet's SIO.

In block 625, an exemplary embodiment of tracking information related to one of a number of SIOs is depicted. The control applet and the directory applet stores a registered list of card applets available within the smart card device. The directory applet may only register the active card applets from data provided by the control applet on the status of each of the card applets. The data provided by the control applet is stored in pre-defined fields of the control applet SIO as illustrated in FIG. 2 at 236B. Only the active instances or application packages (illustrated as 220 in FIG. 2) from the control application SIO are listed in the directory application SIO, and may be presented to an external card reader. Accordingly, when an SIO owned by a card applet is accessed by the control applet or the directory applet for performing an action on the card applet, such action is recorded by updating data tags related to the card applet via block 625. Actions performed on the card applet include, a delete action, a select event, a block event, an unblock event, a personal identification number (PIN) verified event, a PIN failed event, and a payment transaction event. The data tag is illustrated in FIG. 3 at 336G-H, where the data 228 is retrieved from the SIO of the control applet.

Figure 7:
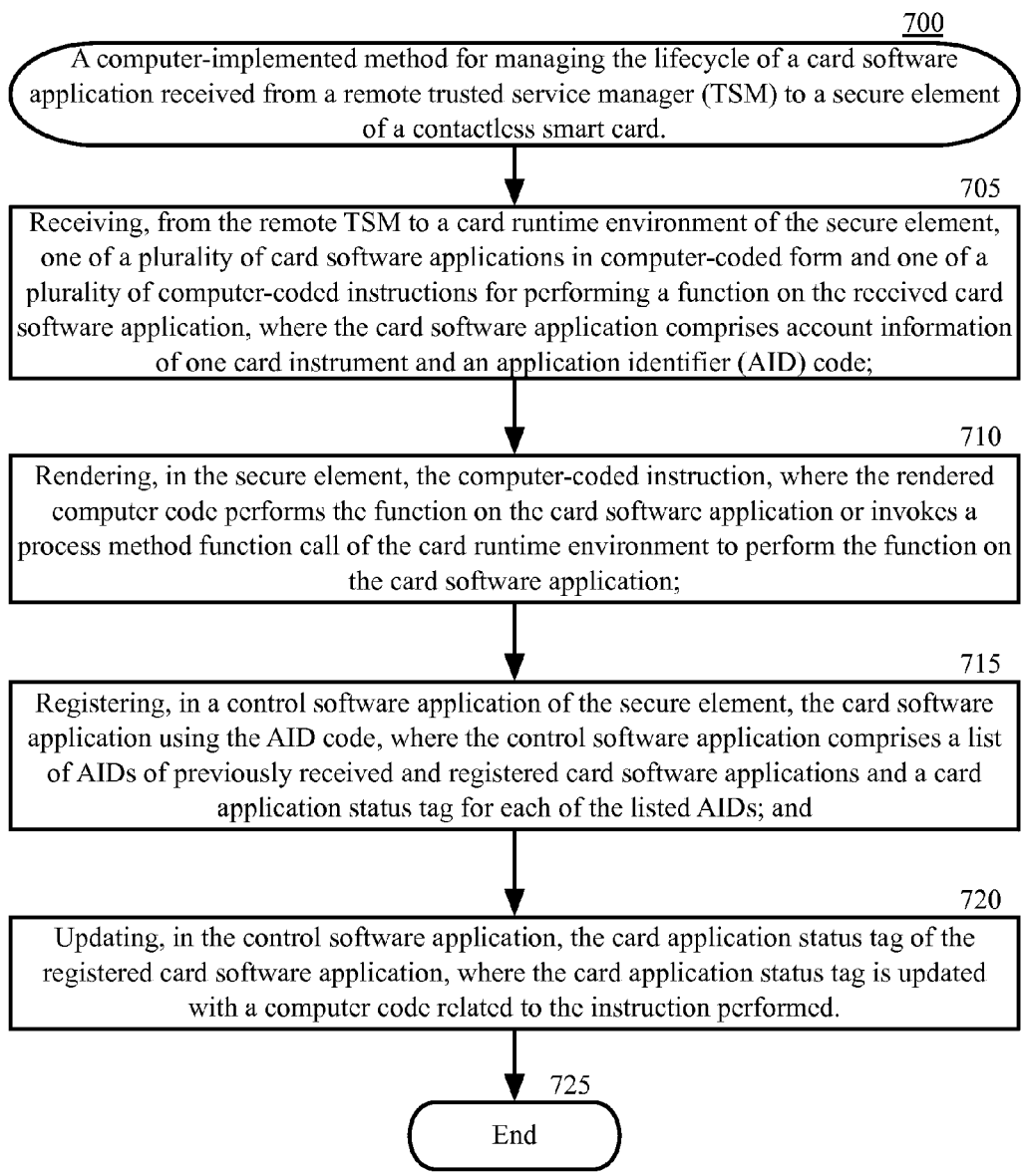
FIG. 7 depicts a flowchart illustrating a method for managing the lifecycle of a card software application received from a remote trusted service manager (TSM) to a secure element of a contactless smart card.

FIG. 7 depicts a flowchart illustrating a method for managing the lifecycle of a card software application received from a remote trusted service manager (TSM) to a secure element of a contactless smart card, according to certain exemplary embodiments. Card software applications may be downloaded to the secure element of a smart card from remote servers via a wireless connection offered by a mobile service provider or a direct to server connection using Wi-Fi. In a Java Card implementation, the card software applications are card applets, which may be installed within the secure element for use with an external card reader. The card software application includes information related to the type of transaction function the application will perform. By way of an example, the card software application may be used to access a credit card account, a debit card account, a loyalty card account, a web-based coupon account, a membership account, a gift card account, or an access card account. The account information is stored within the card and is verified by an external card reader using secure contactless communication with the card software application on the card.

Block 705 depicts a receiving step, where the TSM includes trusted service agents to authenticate requests for card software applications from remote contactless payment devices that include the smart card. The TSM also authenticates instructions for functions to be performed on new or installed card software applications. The card software applications are typically in a computer-coded form, for example, in a Java Card implementation, the card software application may be in CAP file, where the CAP file is a compressed set of components including bytecode, class information, links, and verification information. The smart card receives the card software application, along with an AID or an AID may be assigned to the application by the runtime environment. Block 710 performs the rendering step, wherein the received instruction is rendered to perform the function of the received card software application. Alternatively, the function may be performed on an existing card software application. Block 715 performs a registration step for the card software application, where the AID of the card software application is listed in the control software application along with a computer coded tag, the computer coded tag responsive to the function performed on the card software application. The registration process involves, in one exemplary embodiment, listing the AID code received with the card software application with a status tag that defines the status of the application. The receipt of a card software application from a TSM, installation, and registration of the card software application is illustrated in FIG. 3, and has been described in detail with reference to the exemplary system and device of FIG. 3. The instructions that may be performed on the card software application using process methods include delete, activate, de-activate, add instance, install, block, and unblock.

The TSM also provides instructions to the contactless smart card based on requests received by a user of the contactless smart card. By way of an example, if the user wants to activate/deactivate a card software application registered within the control software application, the user issues a request to the control software application. However, the user may not be able to directly send data or instructions for functions to the control software application, as the controls software application is resident within the secure element. Accordingly, the user needs to secure authentication for instructions prior to the control software application receiving and rendering the instruction. The TSM provides authentication for instructions received by the smart card from the user of the smart card device. When the smart card is embedded within a contactless payment device, the user may provide an instruction via a user-interface software application that renders on the contactless payment device.

In a Java Card implementation, a user-interface MIDlet is deployed on the contactless payment device, where the MIDlet passes user input to the runtime environment (or JCRE) of the smart card, and the runtime environment authenticates the instructions via process method function calls to the TSM. The authenticated computer coded instruction is sent to the runtime environment for rendering. Alternatively, the TSM may issue pre-defined instructions for such exemplary external functions, as blocking/unblocking a card software application because of such issues as a theft, overuses, or account overdraft. Such pre-defined instructions do not need external requests to the control software application, but may deploy directly to the control software application for rendering. Block 710 depicts a step of method 700 wherein the TSM sends one of number of available instructions to be performed on the card software application. The instruction from the TSM may be in the form of a software code to invoke a process method function call of the card runtime environment. Block 720 uses process methods in the card runtime environment to update the card application status tag in the control software application with a computer code related to the instruction performed.

Figure 8:
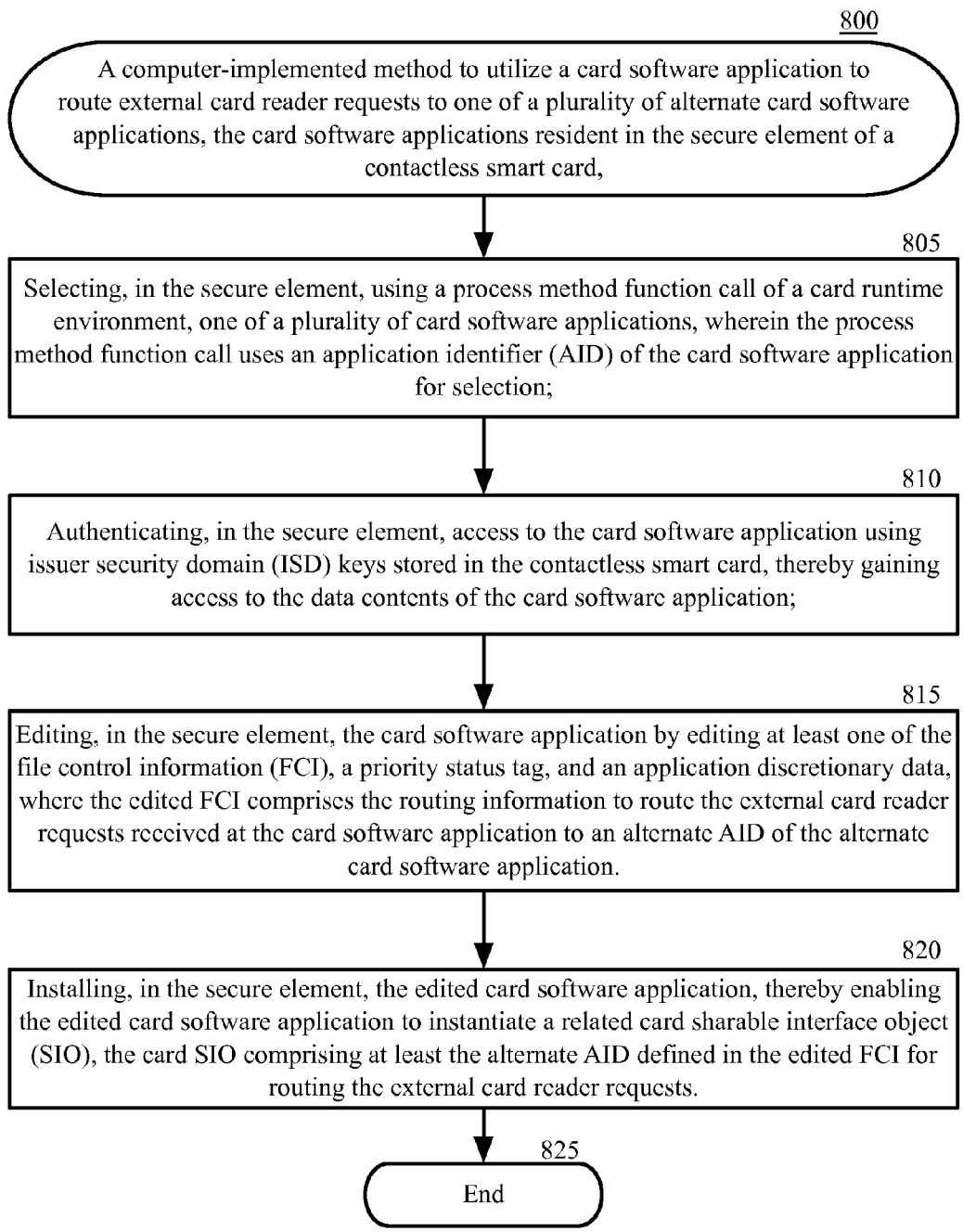
FIG. 8 depicts a flowchart illustrating a method to personalize a card software application for routing external card reader requests to one of a plurality of alternate card software applications.

FIG. 8 depicts a flowchart illustrating a method 800 to utilize a card software application to route external card reader requests to one of a plurality of alternate card software applications, according to certain exemplary embodiments. Block 805 depicts the selection of a card software application, where process method function calls using the appropriate AID of one of a number of registered card software applications is selected. In block 810, an authentication process is performed to enable an external device, for example, the contactless payment device or an external device, to edit the selected card software application. In one example, the authentication is implemented by using issuer security domain (ISD) keys, which are accessible via process method function calls defined by the issuer of the smart card for the card runtime environment. The ISD keys may be defined by the card issuer to protect application memory contexts within the secure element. The ISD key may offer a firewall type protection for applications in the secure element.

Block 815 depicts the editing step of the exemplary embodiment of method 800. Once an external device gains access to the card software application, certain data fields may be edited. In certain exemplary embodiments, the file control information (FCI), a priority status tag, and application discretionary data may be edited. Applets, in the form of the control software application or the card software application typically return a success status when an external card reader selects an application. However, when the selected card software application's FCI data is activated, then the selected card software application returns the FCI data retrieved from an SIO that includes the FCI data as an object field. The FCI data is returned in a tag length value (TLV) format as disclosed above. The FCI data may be edited to include additional AID bytes, where the external card reader selects a short (or 7 byte) AID, and the selected card software application automatically routes the selection to an instance of the card software application, the instance including a full sized AID.

Further, the edited FCI can be edited to include routing information to route an external card reader request received at the card software application to an alternate AID of an alternate card software application. The editing and routing in the card software application enables the smart card to route external card reader requests to any underlying active instance of the card software application. Accordingly, multiple instances of a card software application may reside on the smart card, with one of the instances designated as an active instance. Further, in the case of a legacy reader that may read a short sized AID with 7 bytes of AID data, the reader may be routed to the complete AID using the edited AID as an intermediate routing application.

Block 820 depicts the installation process that follows the editing, where the edited card software application is installed for "make selectable," which causes the runtime environment to instantiate a related card sharable interface object (SIO), the card SIO including the alternate AID defined for retrieval by the FCI as described above.

As mentioned previously, the method 800 is useful with secure element payment applications for legacy readers. Certain legacy readers recognize only applets having a short-form AID. However, the long-form AID applets can allow more functionality and specifically can allow use of multiple software applications within a mobile device. A legacy card reader requests invocation of a software applet based on the short-form AID known to the legacy card reader. A router applet operating on the mobile device receives the request for the short-form AID applet, determines the long-form AID applet corresponding to the short-form AID applet, and routes the request to the long-form AID applet, thereby invoking the long-form AID applet. In this manner, legacy readers that have stored therein only the short-form AID applet can invoke the functionality of the long-form AID applet on the smart card. Additionally, newer readers implementing the long-form AID applet can request directly the long-form AID applet.

Figure 9:
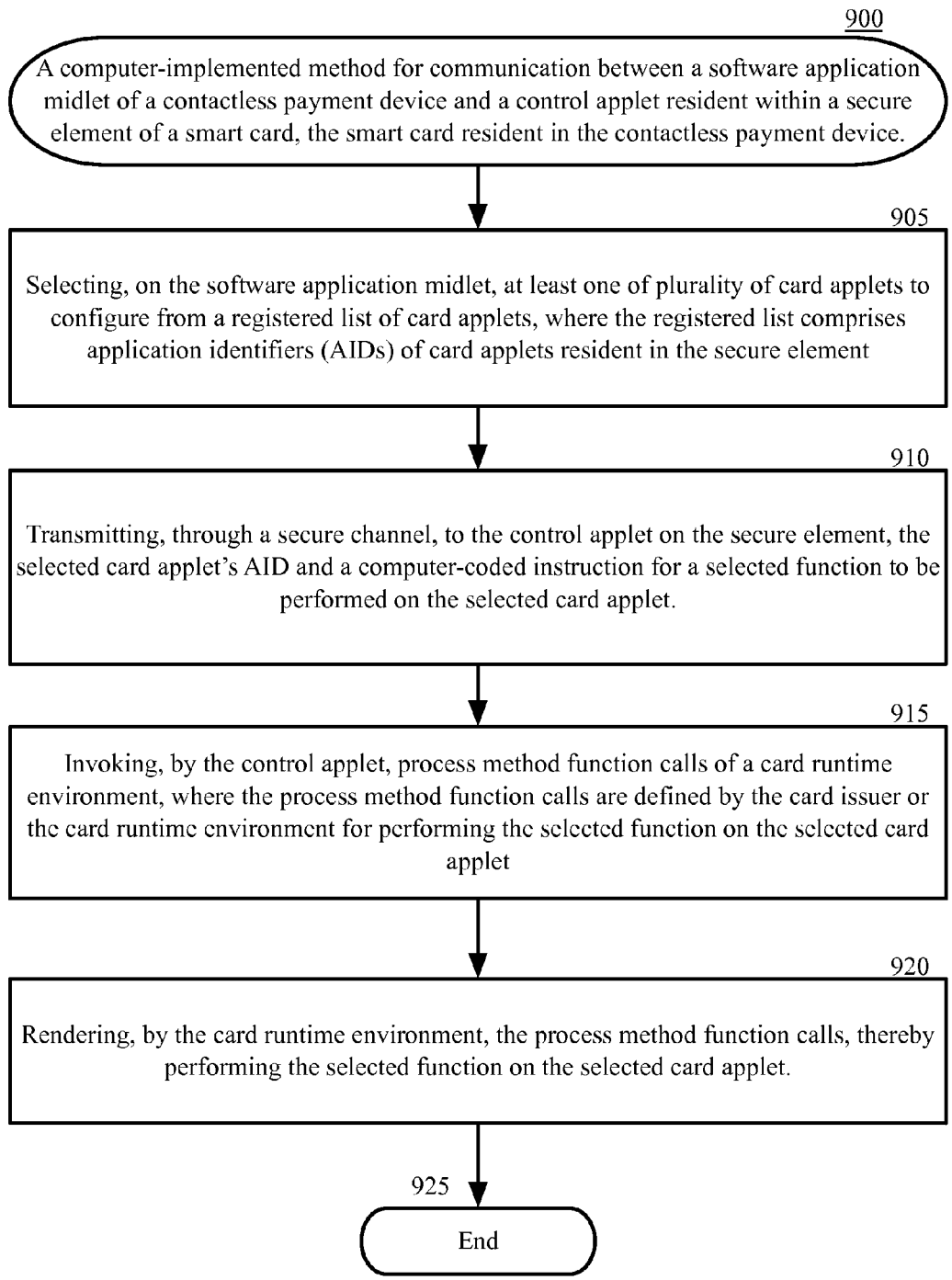
FIG. 9 depicts a flowchart illustrating a method for communication between a software application midlet of a contactless payment device and a control applet resident within a secure element of a smart card.

FIG. 9 depicts a flowchart illustrating a method 900 for communication between a software application midlet of a contactless payment device and a control applet resident within a secure element of a smart card, according to certain exemplary embodiments. In a Java Card implementation, a midlet is a user accessible software application, while the applet is typically an embedded software application with the secure element, inaccessible to external software applications and users. Accordingly, a software application midlet residing outside the secure element may need TSM authentication prior to performing various functions on the card software applications within the secure element. A secure channel for communication may be implemented for enabling the midlet to communicate with the applet, thereby enabling certain functions to be performed without TSM intervention. The secure element typically provides cryptographic and firewall blocks against external access to an applet within the secure element. ISD keys defined by the card issuer or the card runtime environment can be made available to the midlet to access the secure channel.

Many primary functions, such as de-activate and activate for a card applet within the secure element require TSM permissions prior to implementation. Using ISD keys, via process method function calls of the card issuer or the card runtime environment, allows some primary functions to be performed on a card applet using input from a user on an insecure midlet. Block 905 depicts a selection step to identify at least one card applet to configure from a midlet residing outside the secure element. The selection step uses the AID of the intended applet to identify the applet. In an exemplary embodiment, the midlet recognizes the name of the card applet from the user input and extracts an AID related to the name, where the AID is used for the remainder of the steps. Block 910 includes application programmable interface (API) function calls for transmitting the AID of the selected card applet, and for encrypting and transmitting a computer coded instruction for a function to be performed on the card applet. The stored keys in the secure element can be used to verify and decrypt the receiving computer-coded instruction. Block 915 depicts an invoking step, where the control applet initiates process method function calls defined by the card issuer or the card runtime environment. The invoked process method function calls perform the selected function defined in the computer-coded instruction selected by a user on the midlet. The card runtime environment renders, via block 920, the process method function call, thereby performing the selected function on the selected card applet.

One or more aspects of the invention may include a computer program that embodies the functions described and illustrated herein, wherein the computer program is implemented in a computer system that includes instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. The inventive functionality of the invention will be explained in more detail in the following description of exemplary embodiments, read in conjunction with the figures illustrating the program flow.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

The exemplary embodiments can be used with computer hardware and software that perform the methods and processing functions described above. As will be appreciated by those having ordinary skill in that art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for managing the lifecycle of a card software application received from a remote trusted service manager (TSM) for a secure element embedded within a chip of a contactless device, the computer-implemented method comprising:

receiving, from the remote TSM to a card runtime environment of the secure element, one of a plurality of card software applications in computer-coded form and one of a plurality of computer-coded instructions for performing a function on the card software application, wherein the card software application comprises account information of a card instrument and an application identifier (AID) code;

rendering, in the secure element, the one of the plurality of computer-coded instructions, wherein the rendered computer-coded instruction performs the function on the card software application or invokes a process method function call of the card runtime environment to perform the function on the card software application;

embedding a firewall within the secure element to separate between a first sharable interface object (SIO) associated with a control software application of the secure element and a second SIO associated with the card software application, wherein the control software application of the secure element and the first SIO associated with the control software application of the secure element are stored in a first memory embedded within the secure element, wherein the card software application and the second SIO associated with the card software application are stored in a second memory embedded within the secure element, and wherein the secure element is embedded within the chip of the contactless device;

supporting secure data transfer between the first SIO and the second SIO through the firewall;

registering, in the control software application of the secure element, the card software application using the AID code, wherein the control software application of the secure element comprises a list of AIDs of previously received and registered card software applications and a card application status tag for each of the listed AIDs; and updating, in the control software application of the secure element, the card application status tag of the registered card software application, wherein the card application status tag is updated with a computer code related to the function performed.

2. The computer-implemented method according to claim 1, wherein the card runtime environment is a Java Card Runtime Environment (JCRE).

3. The computer-implemented method according to claim 1, wherein the process method function call of the card runtime environment comprises an application programmable interface (API) function configured to render in the card runtime environment of the contactless device.

4. The computer-implemented method according to claim 1, wherein the plurality of computer-coded instructions to be performed on the card software application comprise one or more of delete, activate, de-activate, add instance, install, block, and unblock.

5. The computer-implemented method according to claim 1, wherein the computer-coded instruction and the card software application are selected via an external software application residing outside the secure element and on the contactless device, and wherein an input selection at the external software application is transmitted through a secure communication channel to the control software application of the secure element.

6. The computer-implemented method according to claim 5, wherein the input selection for the computer-coded instruction is sent from the card runtime environment to the remote TSM for authentication and an authenticated computer-coded instruction is transmitted back to the card runtime environment for rendering.

7. The computer-implemented method according to claim 1, further comprising updating, in a directory software application in the secure element, a list of AIDs of active card software applications and related card application status tags.

8. The computer-implemented method according to claim 7, wherein the directory software application is proximity payment system environment (PPSE).

9. The computer-implemented method according to claim 1, wherein the card instrument comprises a smart card application software package or a software instance to be installed within an existing smart card application software package, and wherein the smart card application software package or the software instance comprises information to access a credit card account, a debit card account, a loyalty card account, a web-based coupon account, a membership account, a gift card account, or an access card account.

10. A system for managing the lifecycle of a card software application received from a remote trusted service manager (TSM) for a contactless smart card, the system comprising:

a secure element embedded within a chip of the contactless smart card;

a first memory embedded within the secure element, wherein the first memory is operable to store a control software application of the secure element and a first sharable interface object (SIO) associated with the control software application of the secure element;

a second memory embedded within the secure element, wherein the second memory is operable to store the card software application and a second SIO associated with the card software application;

a firewall embedded within the secure element operable to separate between the first SIO and the second SIO, wherein the firewall is further operable to support secure data transfer between the first SIO and the second SIO through the firewall;

a card runtime environment for receiving from the remote TSM, one of a plurality of card software applications in computer-coded form and one of a plurality of computer-coded instructions for performing a function on the card software application, wherein the card software application comprises account information of a card instrument and an application identifier (AID) code;

process method function calls in the card runtime environment of the contactless smart card for rendering the one of the plurality of computer-coded instructions, wherein the rendered computer-coded instruction performs the function on the card software application or invokes a process method function call of the card runtime environment to perform the function on the card software application;

process method function calls in the card runtime environment of the contactless smart card for registering, in the control software application of the secure element, the card software application using the AID code, wherein the control software application of the secure element comprises a list of AIDs of previously received and registered card software applications and a card application status tag for each of the listed AIDs; and process method function calls in the card runtime environment of the contactless smart card for updating, in the control software application of the secure element, the card application status tag of the registered card software application, wherein the card application status tag is updated with a computer code related to the function performed.

11. The system according to claim 10, wherein the card runtime environment is a Java Card Runtime Environment (JCRE).

12. The system according to claim 10, wherein the plurality of computer-coded instructions to be performed on the card software application comprise one or more of delete, activate, de-activate, add instance, install, block, and unblock.

13. The system according to claim 10, wherein the computer-coded instruction and the card software application are selected via an external software application residing outside the secure element and on the contactless smart card, and wherein an input selection at the external software application is transmitted through a secure communication channel to the control software application of the secure element.

14. The system according to claim 13, wherein the input selection for the computer-coded instruction is sent from the card runtime environment to the remote TSM for authentication and an authenticated computer-coded instruction is transmitted back to the card runtime environment for rendering.

15. The system according to claim 10, further comprising process method function calls in the card runtime environment of the contactless smart card for updating, in a directory software application in the secure element, a list of AIDs of active card software applications and related card application status tags.

16. The system according to claim 10, wherein the process method function calls in the card runtime environment comprise application programmable interface (API) functions configured to render in the card runtime environment of the contactless smart card.

17. The system according to claim 10, wherein the card instrument comprises a smart card application software package or a software instance to be installed within an existing smart card application software package, and wherein the smart card application software package or the software instance comprises information to access a credit card account, a debit card account, a loyalty card account, a web-based coupon account, a membership account, a gift card account, or an access card account.

18. A contactless smart card configured to manage the lifecycle of a card software application received from a remote trusted service manager (TSM), the contactless smart card comprising:

a secure element embedded within a chip of the contactless smart card;

a first memory embedded within the secure element, wherein the first memory is operable to store a control software application of the secure element and a first sharable interface object (SIO) associated with the control software application of the secure element;

a second memory embedded within the secure element, wherein the second memory is operable to store the card software application and a second SIO associated with the card software application;

a firewall embedded within the secure element operable to separate between the first SIO and the second SIO, wherein the firewall is further operable to support secure data transfer between the first SIO and the second SIO through the firewall;

a card runtime environment for receiving from the remote TSM, one of a plurality of card software applications in computer-coded form and one of a plurality of computer-coded instructions for performing a function on the card software application, wherein the card software application comprises account information of a card instrument and an application identifier (AID) code;

process method function calls in the card runtime environment of the contactless smart card for rendering the one of the plurality of computer-coded instructions, wherein the rendered computer-coded instruction performs the function on the card software application or invokes a process method function call of the card runtime environment to perform the function on the card software application;

process method function calls in the card runtime environment of the contactless smart card for registering, in the control software application of the secure element, the card software application using the AID code, wherein the control software application of the secure element comprises a list of AIDs of previously received and registered card software applications and a card application status tag for each of the listed AIDs; and process method function calls in the card runtime environment of the contactless smart card for updating, in the control software application of the secure element, the card application status tag of the registered card software application, wherein the card application status tag is updated with a computer code related to the function performed.

19. The contactless smart card according to claim 18, wherein the card runtime environment is a Java Card Runtime Environment (JCRE).

20. The contactless smart card according to claim 18, wherein the plurality of computer-coded instructions to be performed on the card software application comprise one or more of delete, activate, de-activate, add instance, install, block, or unblock.

21. The contactless smart card according to claim 18, wherein the process method function calls in the card runtime environment comprise application programmable interface (API) functions configured to render in the card runtime environment of the contactless smart card.

22. The contactless smart card according to claim 18, wherein the card instrument comprises a smart card application software package or a software instance to be installed within an existing smart card application software package, and wherein the smart card application software package or the software instance comprises information to access a credit card account, a debit card account, a loyalty card account, a web-based coupon account, a membership account, a gift card account, or an access card account.

\* \* \* \* \*